United States Patent
Redd et al.

(10) Patent No.: US 6,646,754 B1
(45) Date of Patent: Nov. 11, 2003

(54) BACKPRINTING IMAGE PRINTS

(75) Inventors: Jarret L. Redd, San Jose, CA (US); Daniel R. Baum, Menlo Park, CA (US)

(73) Assignee: Shutterfly, Inc., Redwood City, CA (US)

( * ) Notice: Subject to any disclaimer, the term of this patent is extended or adjusted under 35 U.S.C. 154(b) by 0 days.

(21) Appl. No.: 09/450,899

(22) Filed: Nov. 29, 1999

Related U.S. Application Data

(63) Continuation-in-part of application No. 09/436,704, filed on Nov. 9, 1999, now Pat. No. 6,263,139.
(60) Provisional application No. 60/151,533, filed on Aug. 31, 1999, provisional application No. 60/159,372, filed on Oct. 14, 1999, and provisional application No. 60/167,243, filed on Nov. 24, 1999.

(51) Int. Cl.$^7$ ................................................ H04N 1/04
(52) U.S. Cl. .................. 358/1.13; 358/487; 358/296; 358/302; 358/305; 358/1.1; 358/1.9; 358/502
(58) Field of Search ................................ 358/487, 1.13, 358/296, 302, 305, 1.1, 1.9, 502

(56) References Cited

U.S. PATENT DOCUMENTS

| | | | | |
|---|---|---|---|---|
| 4,675,755 A | * | 6/1987 | Baumeister et al. | 386/52 |
| 5,276,472 A | * | 1/1994 | Bell et al. | 396/312 |
| 5,477,353 A | * | 12/1995 | Yamasaki | 358/487 |
| 5,675,400 A | * | 10/1997 | Stephenson, III | 355/40 |
| 5,703,701 A | * | 12/1997 | Yamamoto et al. | 355/41 |
| 5,745,220 A | * | 4/1998 | Okazaki et al. | 355/40 |
| 5,925,407 A | * | 7/1999 | Ostman | 427/209 |
| 5,974,401 A | * | 10/1999 | Enomoto et al. | 355/40 |
| 6,050,733 A | * | 4/2000 | Yamamoto | 355/40 |
| 6,154,295 A | * | 11/2000 | Fredlund et al. | 358/403 |
| 6,181,409 B1 | * | 1/2001 | Calhoun | 355/39 |
| 6,185,000 B1 | * | 2/2001 | Shiota et al. | 358/1.18 |
| 6,297,874 B1 | * | 10/2001 | Ikeda et al. | 355/40 |
| 6,331,903 B1 | * | 12/2001 | Nakazawa et al. | 355/27 |
| 6,347,467 B1 | * | 2/2002 | Meyer | 40/124.06 |
| 6,349,194 B1 | * | 2/2002 | Nozaki et al. | 434/308 |
| 6,388,732 B1 | * | 5/2002 | Williams et al. | 355/40 |
| 6,393,743 B1 | * | 5/2002 | Whitworth | 40/124.01 |
| 6,483,570 B1 | * | 11/2002 | Slater et al. | 355/40 |

* cited by examiner

*Primary Examiner*—Edward Coles
*Assistant Examiner*—Ashanti Ghee
(74) *Attorney, Agent, or Firm*—Tran & Associates

(57) ABSTRACT

A system and method of backprinting image prints in which an order is received specifying one or more recipients and, for each specified recipient, a set of one or more images associated with that recipient. For each recipient specified by the order, the images associated with the recipient are separated into at least one printable unit of images, and, for each printable unit, each image in the printable unit is printed on a first side of an image print. Backprinting information is backprinted on the other side of one or more of the image prints. The backprinting information can be received from a user and backprinted onto one or images.

62 Claims, 34 Drawing Sheets

BACKPRINTING IMAGE PRINTS

Priority is claimed from U.S. provisional patent applications Ser. No. 60/151,533, filed Aug. 31, 1999, Ser. No. 60/159,372, filed Oct. 14, 1999, and Ser. No. 60/,167,243, filed Nov. 24, 1999, and entitled "Digital Photo Printing Services," and this application is a continuation-in-part of U.S. patent application Ser. No. 09/436,704, filed Nov. 9, 1999, now U.S. Pat. No. 6,263,139, and entitled "Distributing Images to Multiple Recipients," which is incorporated by reference.

TECHNICAL FIELD

This application relates to printing images, for example, digital and/or physical copies of images.

BACKGROUND

Traditionally, conventional photo-finishing processes operate in a "linear" manner in which an ordered set of prints are produced from a linear, ordered set of negative images (i.e., a strip of exposed and developed film). For example, in a conventional photo-finishing process, a set of negative images are developed from an exposed film. Typically, the negative images are arranged on the developed film (referred to as a "negative") in an ordered, linear set. For example, a negative 130 is shown in FIG. 1 with a set of negative images 132 arranged sequentially on the film. After the negative has been produced in the developing step, prints are printed using the negative.

Modern film-processing laboratories are designed to process large reels of film. Each large reel of film is constructed by splicing together several (e.g., around 100 or more) units of film that are received from several customers. Conventional automated printing equipment, however, typically can only associate one set of processing parameters (such as finish, size, and number of copies) with each reel of film that is being processed. As a result, each print produced from the same reel of film is produced with the same processing parameters. For example, as shown in FIG. 1, such conventional automated printing equipment can produce a set 134 of prints in which each print in the set 134 is intended for the same recipient 136 and is printed once as a 4"×6" print with a glossy finish. In a separate processing run in which different processing parameters are entered (e.g., in a subsequent pass of the same reel of film through the automated printing equipment), a second set 138 of prints can be produced from the negative 130 in which each print in the set 138 is intended for the same recipient 140 and is printed three times as a 4"×6" print with a matte finish. In yet another separate processing run in which different processing parameters are entered, a third set 142 of prints can be produced from the negative 130 in which each print in the set 142 is intended for the same recipient 144 and is printed once as a 5"×7" print with a glossy finish.

Because conventional automated photo-finishing equipment and techniques typically require that each print produced from the same film be produced with the same processing parameters, conventional film-processing labs typically require their customers to choose a single set of processing parameters that will be applied to all the prints to be generated from a given unit of film. In other words, although conventional photo-processing labs allow customers to order "double prints" (i.e., two copies of each image on a unit of film), the customers typically are not able to specify separate processing parameters for the two sets of prints. For example, the customer is not able to specify that one of the sets of prints is to be printed as 4"×6", glossy prints for the customer's parents and that the other set of prints is to be printed as 5"×7", matte prints for the customer. Instead, the customer typically only can specify one set of processing parameters for both sets of prints (e.g., 4"×6", glossy prints for the customer). Also, customers typically are not allowed to specify processing parameters on a per-image basis (e.g., customers cannot select certain images to be printed twice while the rest of the images in the unit of film are to be printed once or not all). Therefore, if a customer would like to get two prints of certain images within a unit of film, the customer typically has to order two prints of every image in the unit of film. Likewise, the customer typically is unable to specify that only certain images in the unit of film are to be printed; instead, the customer will have to order, and pay for, prints of all the images in a given unit of film.

Moreover, information about the images in a given reel of film (e.g., processing parameters, which customer is associated with a particular group of images, etc.) typically is not indicated on the negative film itself. Thus, a technician in the lab cannot detect errors (e.g., the use of incorrect processing parameters, the association of an incorrect customer with a group of images, etc.) using only the film; instead, other ways of keeping track of such information must be used. Typically, bar codes or other records are kept with each reel of film during processing to indicate which customer's order is associated with that reel. For example, the tape that is used to splice a unit of film onto the reel of film typically includes a bar code that is used to associate a customer with the unit of film. Also, typically these bar codes or other records must be maintained in a precise order so that the prints produced from the reel of film can be associated with the proper customer. If the bar codes or other records are misplaced or somehow get out of order, the prints produced from the reel of film may be associated with the incorrect customer.

After the film has been developed and the prints have been printed, the negatives are cut into strips, typically from about 5 to 7 inches in length, and are returned to the customer along with the prints. If the user wishes to have additional prints (often referred to as "reprints") made, the customer can take the strips of negatives to a photo-finishing lab and request that particular reprints be made from the negative strips. Typically, when ordering reprints, the customer can specify some of the processing parameters (e.g., finish, number of copies, and size) on a per-image basis. However, typically all reprints ordered from a single set of negative strips must be intended for the same recipient (i.e., the customer ordering the reprints). Also, many customers find it inconvenient to keep track of all of their negatives; indeed, customers often lose the negative strips.

Typically, after receiving negative strips from a customer, a lab technician tapes the negative strips to a punch tape, which acts as a carrier for the negative strips. The technician must manually identify each negative image in the negative strip from which a reprint is to be created and punch a set of punches in the punch tape next to each of the identified negative images specifying the particular processing parameters designated by the customer. The punch tape (with the negative strips taped to it) then is run through reprint equipment, which produces the specified prints based on the punches. Such conventional processes used by labs to create reprints from negative strips, however, are labor intensive and prone to error.

One increasingly popular alternative to conventional, film-based photography is digital photography. A digital camera 108, shown in FIG. 2, enables users to take pictures (i.e., images), which are saved in memory (not shown) within the digital camera 108 in a digital (electronic) format. After taking and storing the images, the user can connect the digital camera 108 to a computer system 100 in order to upload the digital images to the computer's disk drive or other non-volatile memory 110. Once the digital images are uploaded to the computer system 100, the user can erase the digital images from the memory of the digital camera 108 so that the user can take and store additional images using the digital camera 108.

The computer system 100 typically includes a hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system includes various input/output (I/O) devices (mouse 103, keyboard 105, display 107) in addition to the digital camera 108 and a general purpose computer 100 having a central processor unit (CPU) 121, an I/O unit 117 and a memory 109 that stores data and various programs such as an operating system 111, and one or more application programs 113. The computer system 100 also typically includes non-volatile memory 110 (e.g., flash RAM, a hard disk drive, and/or a floppy disk or other removable storage media) and a communications card or device 123 (e.g., a modem or network adapter) for exchanging data with a network 127 via a communications link 125 (e.g., a telephone line).

In addition to taking digital pictures with a digital camera 108, users can obtain digital images, for example, of film-based prints from a traditional camera, by sending an exposed film into a photo-finishing service, which develops the film to make prints and then scans the prints or negatives to generate digital image files. The digital image files then can be transmitted back to the user by e-mail or on a CD-ROM, diskette, or other removable storage medium.

In any event, once the digital images are stored on the computer 100, a user can perform various operations on them. For example, an image viewer application can be used to view the images or a photo editor application can be used to touch-up or otherwise modify the images. In addition, an electronic messaging (e.g., e-mail) application can be used to transmit the digital images to other users.

In addition to viewing the digital images on the computer display 107, users often desire to have hard copies (physical prints) made of digital images. Such hard copies can be generated locally by the user using output devices such an inkjet printer or a dye sublimation printer. In addition, users can transmit digital images (e.g., either over a computer network or by using a physical storage medium such as a floppy disk) to a photo-finishing service, which can make hard copies of the digital images and send them (e.g., by U.S. Mail or courier service) back to the user.

FIGS. 3A–3F show a sequence of screen shots that a user might encounter when transmitting digital images to a photo-finishing service to have hard copies (prints) made of the images. In FIG. 3A, the user first encounters a contact information window 200 in which the user must enter several items of contact information such as first and last names 202, 204, address 206, city 208, state 210, country 212, phone 214, fax 216, and e-mail address 218. This information typically is required by the photo-finishing service for purposes of billing and shipping.

After the user has entered the required information, the user presses the "Next" button 220 to arrive at the next screen—an image selection window 222 as shown in FIGS. 3B and 3C. In the image selection window 222, the user designates the specific images of which hard copies are to be made. The digital images either can be selected from among the images stored on the user's computer by clicking the "Select Image . . ." button 230 or they can be acquired from a digital camera or scanner attached to the user's computer by clicking the "Acquire Image . . ."button 232. Once selected, the images can be viewed and/or cropped by clicking on the "View/Crop" button 234.

The user can designate the hard copy format and other parameters (e.g., size, number of copies, paper type) on a per-image basis. That is, for each selected image, the user must specify the hard copy format and other parameters by selecting or entering the desired options using drop-down list 224 and text box 226. This approach requires the user to go through the option selection process multiples times in order to order multiple images. The selected images and their associated parameters are shown in display area 228. Typically, each order for prints must meet a minimum order amount 223 (e.g., five dollars).

After the images and their respective hard copy parameters have been selected, the user clicks the Next button 236 and a shipping and payment information window 238 is presented. In this window 238, the user selects a desired shipping method from drop-down list 240 and specifies a method of payment and associated verification information in text boxes 242, 244, 246 and 248.

After this information has been provided, the user clicks the Next button 250 and is presented with an order confirmation window as shown in FIG. 3E. The order verification window 250 allows the user to view and confirm the order including the images selected and their respective parameters in display area 252, as well as the price of the order 254. If the user is satisfied with the order, the user clicks the Finish button 256 to complete the order.

Upon completing the order, the images are uploaded to the photo-finishing service as indicated by the upload window 258 in FIG. 3F. Once the images are uploaded, the photo-finishing service arranges to have prints made of the selected images and to have the prints mailed to the recipient and address specified in the contact information window 200. If the user desires to have prints of the same (or different) images sent to another person (e.g., a family member or friend), the user typically must repeat the entire order generating process represented by FIGS. 3A–3F. Generally, repeating the ordering process to send prints to another person involves entering a considerable amount of redundant information, meeting the minimum order amount for each order, and incurring separate charges on the user's credit card (or other financial instrument).

The present inventors recognized that it would be advantageous to take a single multiple-recipient order for image prints, break it down into sub-orders corresponding to a single recipient, break down each sub-order into printable units (referred to as "sub-batches") having matching processing parameters, and scheduling and printing the sub-batches on automated printing equipment in an optimized manner.

SUMMARY

Implementations may include various combinations of the following features.

In one aspect, a method of backprinting image prints includes receiving an order specifying one or more recipients and, for each specified recipient, a set of one or more images associated with that recipient. The method may also include, for each recipient specified by the order, separating the images associated with the recipient into at least one printable unit of images and, for each printable unit, printing each image in the printable unit on a first side of an image print. The method further may include backprinting on the other side of one or more of the image prints.

Non-image information (e.g., an image number associated with the image, a printable unit number associated with the printable unit from which the image print was printed, an order number associated with the order from which the image print was printed, reorder information such as a telephone number and/or a universal resource locator for a website from which prints can be reordered, a bar code, and a message) may be backprinted on at least one image print. A bar code backprinted on the image print may encode an audio message, the image number associated with the image, and/or the printable unit number associated with the printable unit from which the image print was printed. A message backprinted on image print may have been received from a user. Also, the method may include backprinting a first message (e.g., a first message received from a user) on the other side of one or more image prints associated with a first recipient and backprinting another message, different from the first message, (e.g., another message received from a user) on the other side of one or more image prints associated with another recipient. The message backprinted on an image print may include, for example, the name of the photographer who took the image, the date the image was taken, the date the image was printed, a copyright notice, language describing any legal restrictions on using the image, and an advertisement.

The method may also include, prior to backprinting, inverting the image print, aligning the inverted image print, and reducing curling of the image print (e.g., using suction). The method may further include, for each recipient, separating the images associated with the recipient into one or more sub-orders. Also, separating the images associated with the recipient into at least one printable unit of images may include, for each sub-order, separating the images associated with the sub-order into one or more sub-batches where each sub-batch represents a printable unit.

In another aspect, a backprinting system may include a front-end computer sub-system for receiving an order specifying one or more recipients and, for each specified recipient, a set of one or more images associated with that recipient. The system also may include a scheduler, in communication with the front-end computer sub-system and the plurality of printers, that, for each recipient specified by the order, separates the images associated with the recipient into at least one printable unit of images. The system may further include one or more printers, in communication with the scheduler, for printing each image in a printable unit on a first side of an image print. Moreover, the system may include one or more backprinters, each backprinter receiving one or more image prints from at least one of the one or more printers and backprinting on the other side of the one or more image prints. Each backprinter may backprint non-image information on the one or more image prints.

The non-image information may include an image number associated with the image, a printable unit number associated with the printable unit from which the image print was printed, an order number associated with the order from which the image print was printed, reorder information (e.g., a telephone number and/or a universal resource locator for a website from which prints can be reordered), a bar code (e.g., a bar code encoding an audio message, the image number associated with the image, and/or the printable unit number associated with the printable unit from which the image print was printed), and a message.

The front-end computer sub-system may receives a message that is backprinted on an image print from a user. Also, each backprinter may backprint a first message (e.g., a message received from a user) on the other side of one or more image prints associated with a first recipient and may backprint another message, different from the first message, (e.g., a message received from a user) on the other side of one or more image prints associated with a second recipient. The message may include the name of the photographer who took the image, the date the image was taken, the date the image was printed, a copyright notice, language describing any legal restrictions on using the image, and an advertisement.

The system may include an inverter that inverts the image print prior to backprinting, an alignment device that aligns the inverted image print prior to backprinting, and curl reduction equipment that reduces curling of the image print prior to backprinting (e.g., a vacuum table that uses suction to reduce curling of the image print). The scheduler may further include scheduler software embodied in a computer-readable medium comprising instructions for causing the scheduler to separate the images associated with the recipient into one or more sub-orders. The scheduler software may further include instructions for causing the scheduler, for each sub-order, to separate the images associated with the sub-order into one or more sub-batches, each sub-batch representing a printable unit.

In another aspect, a method of backprinting an image may include receiving backprinting information from a user, printing an image on a first side of an image print, and backprinting the backprinting information on the other side of one or more of the image prints. The method may also include receiving an image from a user.

The backprinting information may include non-image information such as an image number associated with the image, a printable unit number associated with the printable unit from which the image print was printed, an order number associated with the order from which the image print was printed, reorder information (e.g., a telephone number and/or a universal resource locator for a website from which prints can be reordered), a bar code (e.g., a bar code that encodes one or more of the following: an audio message, the image number associated with the image, and the printable unit number associated with the printable unit from which the image print was printed), and a message (e.g., a message including the name of the photographer who took the image, the date the image was taken, the date the image was printed, a copyright notice, language describing any legal restrictions on using the image, and/or an advertisement). The user from which the backprinting information is received may be different from the user from which the image is received. The method may also include, prior to backprinting, inverting the image print, aligning the inverted image, and reducing curling of the image (e.g., using suction).

In another aspect, a backprinting system may include a front-end computer sub-system for receiving an image and backprinting information from a user. The system may also include a printer in communication with the front-end computer sub-system for printing the image on a first side of an image print. The system further may include a backprinter that receives one or more image prints from the printer and backprints the backprinting information on the other side of the one or more image prints. The backprinting information may include information generated by the backprinting system.

Also, the backprinting information may include non-image information (e.g., an image number associated with the image, a printable unit number associated with the printable unit from which the image print was printed, an order number associated with the order from which the image print was printed, reorder information, a bar code, and a message). The reorder information may include a telephone number and/or a universal resource locator for a website from which prints can be reordered. The message may include the name of the photographer who took the image, the date the image was taken, the date the image was printed, a copyright notice, language describing any legal restrictions on using the image, and an advertisement. The non-image information may optionally include a bar code that encodes an audio message, the image number associated with the image, and/or the printable unit number associated with the printable unit from which the image print was printed.

The system may also include an inverter that inverts the image print prior to backprinting, an alignment device that aligns the inverted image print prior to backprinting, and curl reduction equipment that reduces curling of the image print prior to backprinting (e.g., a vacuum table that uses suction to reduce curling of the image print).

In another aspect, an article of manufacture may include an image print medium having a scanable symbol (e.g., encoding user-input information) embodied on the back of the image print. The scanable symbol may cause a scanner to decode information encoded in the scanable symbol when the scanable symbol is scanned by the scanner. The scanner may decode any user-input information encoded in the scanable symbol. For example, the scanable symbol may be a bar code that causes a bar code reader to decode information encoded in the bar code. The bar code may encode an audio message (e.g., a user-input audio message) that causes the bar code reader to play the audio message when the bar code reader scans the bar code. The bar code may also encode a number associated with the article of manufacture, which causes the scanner to identify the article of manufacturer by decoding the number.

One or more of the following advantages may be provided. The systems and techniques described here provide an efficient mechanism for printing images in an optimized manner. An order of images to be printed can be divided into one or more printable units of images that can be separately scheduled for printing. By dividing an order into printable units of images, the separate printable units can be printed in a non-linear manner in order to use more efficiently available printing resources. For example, a single multiple-recipient order can be divided into sub-orders corresponding to a single recipient; then, each sub-order can be divided into sub-batches, which correspond to separate printable units. Sub-batches from different sub-orders and different orders can be sorted and combined into a batch for printing on the available printing resources.

In addition, such sub-batches or other printable units can be scheduled for printing according to a global scheduling algorithm in which orders to be printed during a given unit of time (e.g., a work shift) are divided into sub-orders and sub-batches at the beginning of the shift. Then, batches are assembled from the sub-batches and scheduled for printing during the shift so as to optimize the use of printing resources over the course of the shift. Also, an immediate or just-in-time scheduling algorithm can be used in which orders are received and divided into sub-orders and sub-batches periodically over the course of a shift; batches are assembled and assigned to printers periodically during the shift based on the sub-batches and printers that are currently available when the batch is assembled.

Also, the systems and techniques described here provide mechanisms for providing improved control and tracking of the image printing process. For example, a low resolution camera can be used to capture low-resolution data that can be used to perform image print verification checks (i.e., checks of the ordering of the image prints) and quality checks (i.e., checks of the image quality of the image prints). Moreover, bar code readers can be used to read bar codes printed on destination identifier prints and/or the backs of image prints in order to identify when sub-batches and image prints have been printed, backprinted, binned, and/or shipped.

Moreover, photo-sensors positioned along a print line can be used to develop timing data that can be used for the detection of error conditions in the print line. For example, timing data can be used to develop a line profile that identifies how long it should take a given image print to pass the various photo sensors and a batch profile that identifies how long it should take successive image prints to pass a given photo sensor. The timing data can be used to detect conditions such as paper jams and for process control.

Additionally, a print line can be provided that is fully automated (i.e., does not require an operator to perform any of the line processing functions) from the point the images are uploaded by a user until the packaged image prints are placed in a shipping bin for shipping to the specified recipients. For example, an automated insertion system can be used to automatically insert fully processed image prints into packaging material, seal the packaging material, and/or sort the packaged image prints into appropriate shipping bins.

Furthermore, the state of each image print that is to be generated from an order can also be tracked so as to provide more precise tracking and error recovery. For example, the states that are tracked for each image print to be generated from an order can include an "Entered" state indicating that the image from which the image print is to be generated has been included in an order but has not yet been sent to a print lab or print line for printing, a "Processing" state indicating that the image from which the image print is to be generated has been sent to a print lab or print line for printing, a "Binned" state indicating that the image print has been printed and binned, and a "Shipped" state indicating that the image print has been shipped. The states also can include a "Stored" state indicating that the image print has been stored, e.g., for consolidation with other image prints. The multiple states can be used to track the image prints as they are being printed and to recover from errors in the printing process. For example, if an error occurs during the processing of a given batch, image prints from the batch that are in the Processing state when the error occurred still need to be printed after the error has been removed while any image prints from the batch that are in the Binned state or Shipped state when the error occurred need not be printed again once the error is removed from the print line. As a result, the amount of rework required to recover from errors can be reduced.

Also, backprinting information (e.g., non-image information) can be backprinted on the back of an image print. The information backprinted on the back of an image print can be used, for example, in the print lab to identify and/or track individual image prints as well as the sub-batches, batches, sub-orders, and orders with which the image prints are associated. Also, the backprinted information can be used to convey additional information to a recipient of the image print (e.g., a user-input message, advertisement, where reprints can be ordered, and/or tracking information such as an image number and/or sub-order or order number). The backprinting information can also be used to encode an audio message (e.g., an audio message provided by the photographer or other user) in a bar code that the recipient of the image print can decode to listen to the audio message.

The details of one or more embodiments are set forth in the accompanying drawings and in the description below. Other features, objects, and advantages of the invention will become apparent from the description and drawings, and from the claims.

DRAWING DESCRIPTIONS

Figure 9:
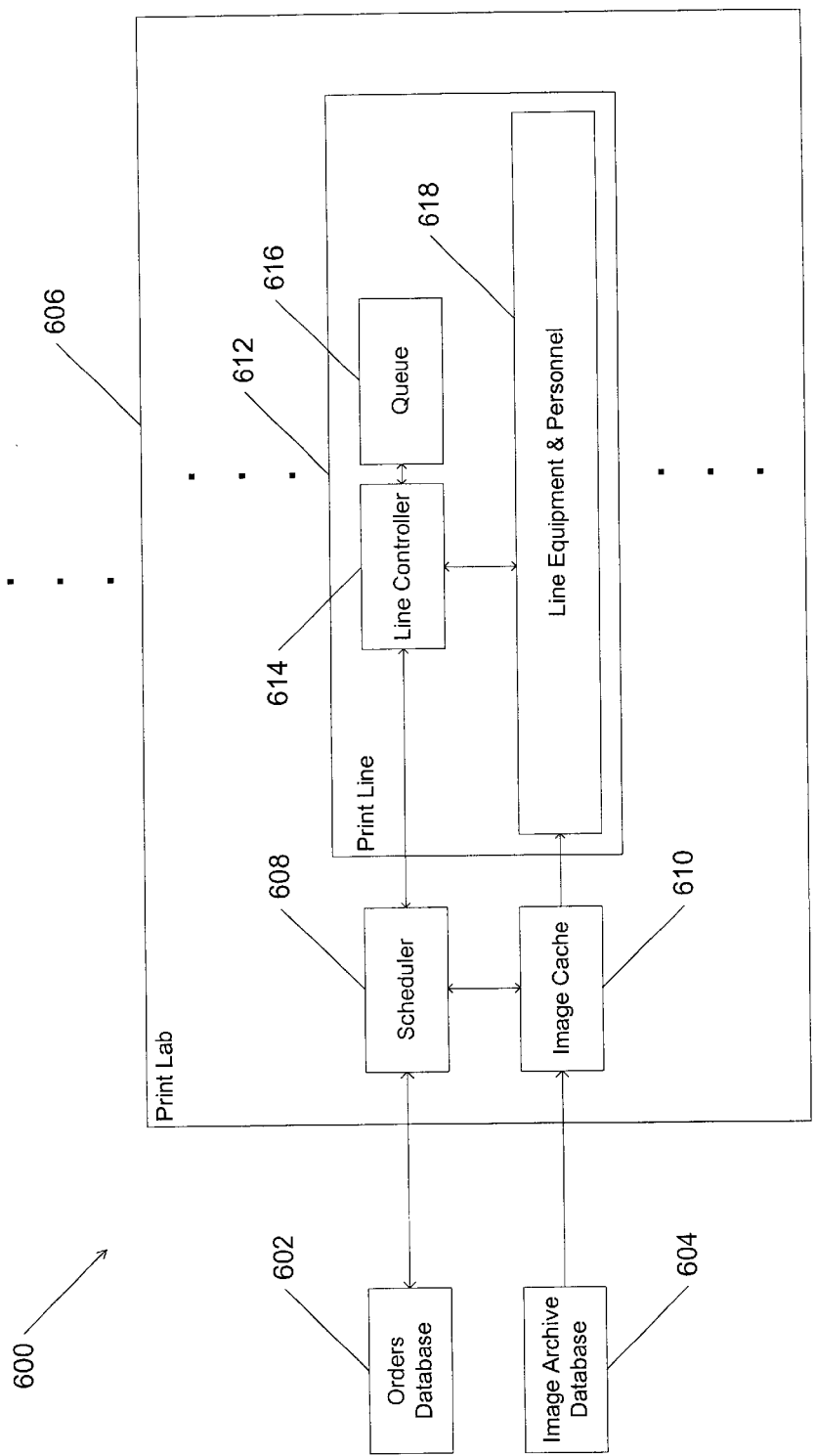
FIG. 9 is a block diagram of a print lab system.
Figure 13A:
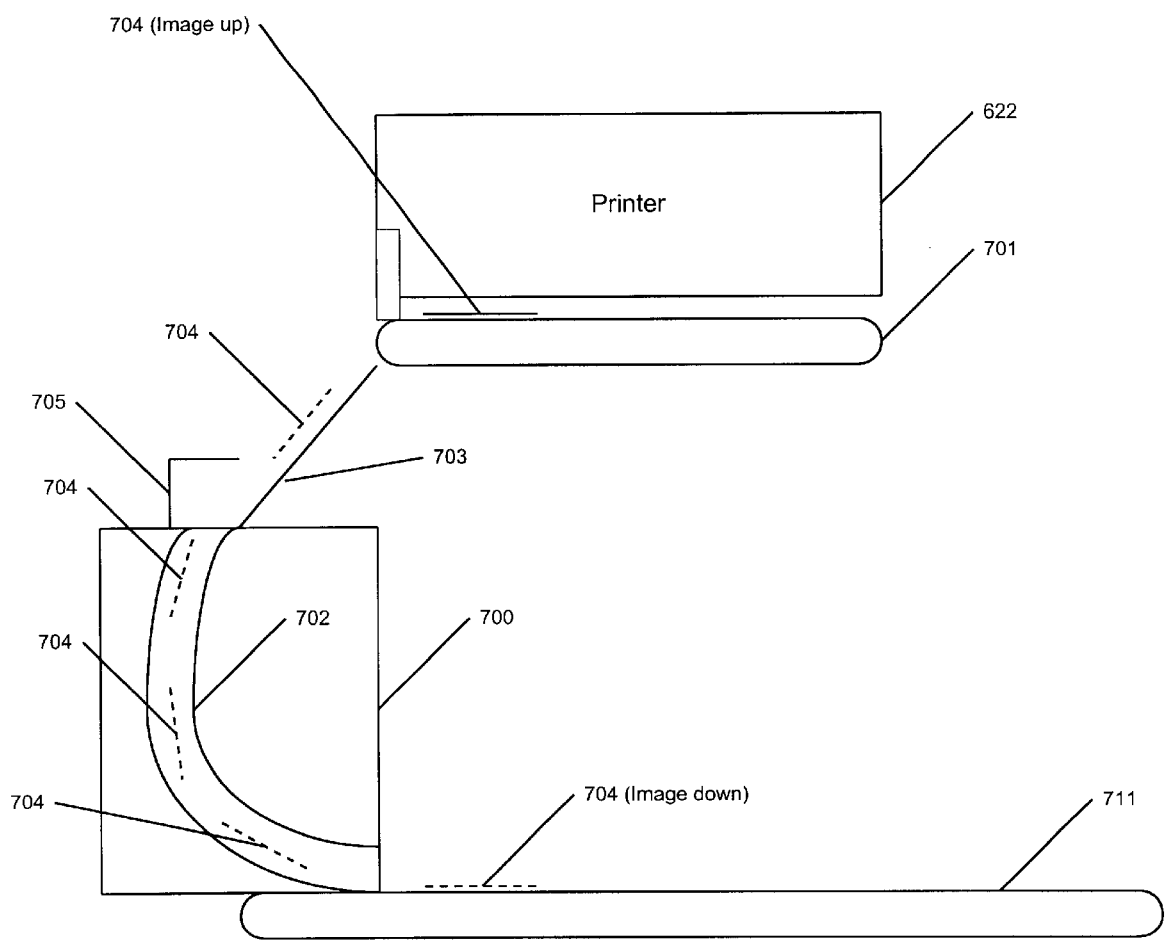
Figure 13B:
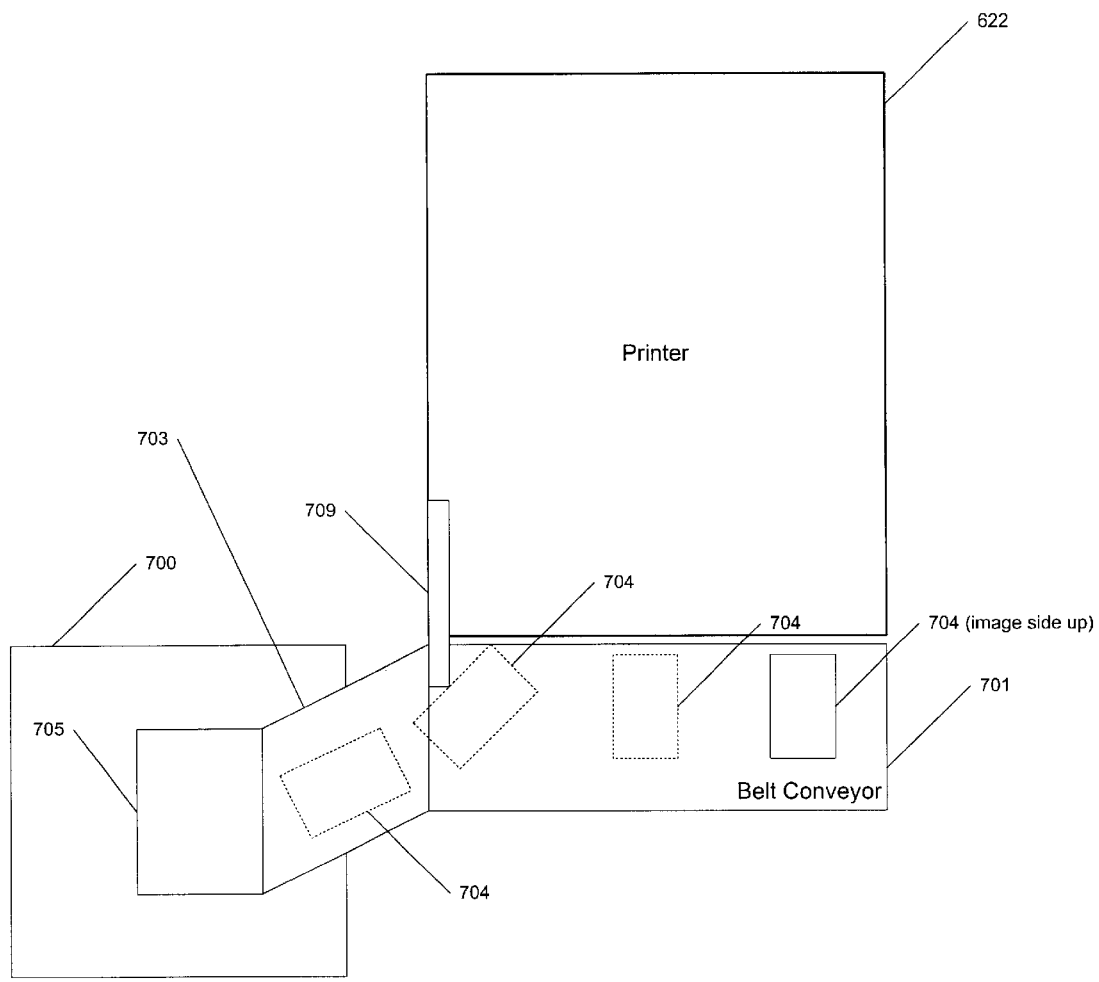

FIGS. 13A–B are schematic diagrams of a chute inverter that can be used in the print lab system of FIG. 9.

Figure 14:
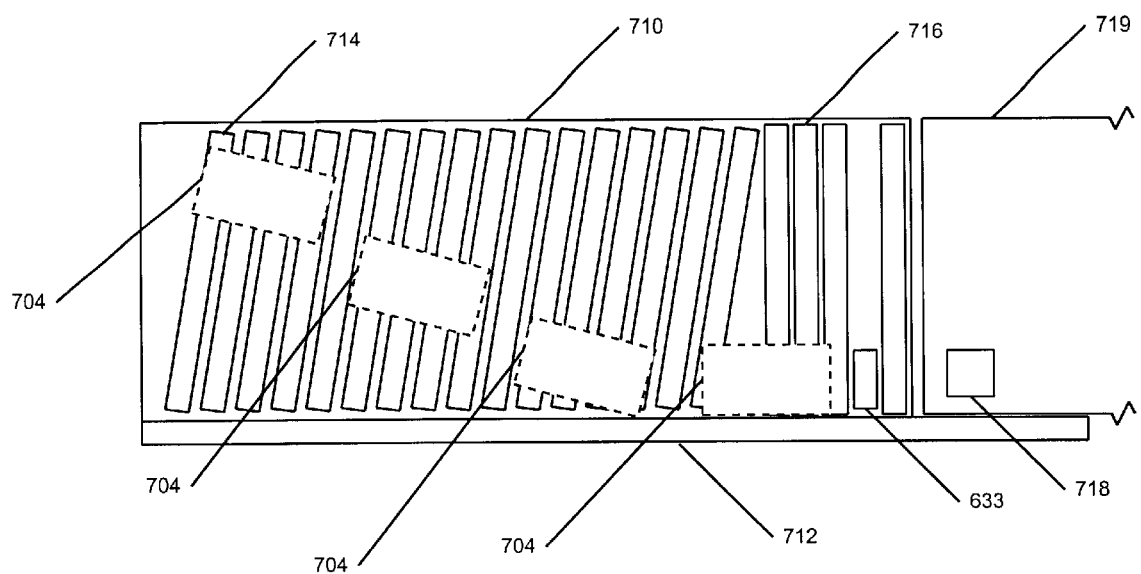

FIG. 14 is schematic diagram of a skew conveyor that can be used in the print lab system of FIG. 9.

Figure 15A:
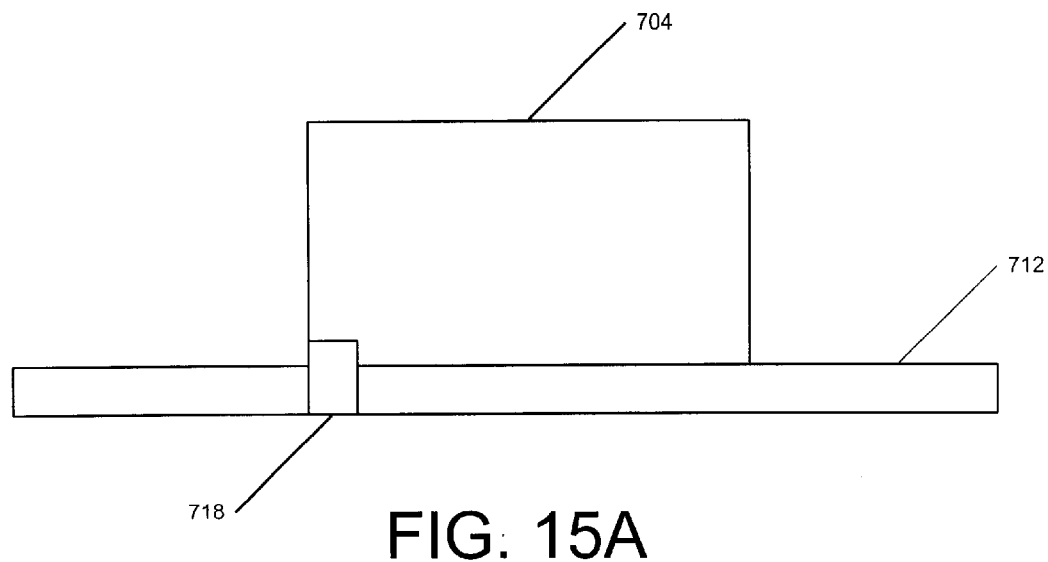

FIG. 15A is a schematic diagram of a properly aligned image print as it passes the sensor of FIG. 14.

Figure 15B:
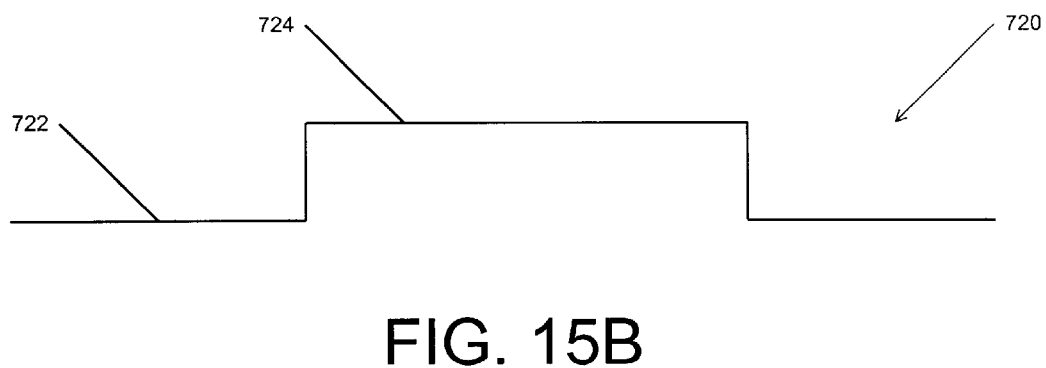

FIG. 15B is an example of a signal that is produced as result of the image print of FIG. 15A.

Figure 15C:
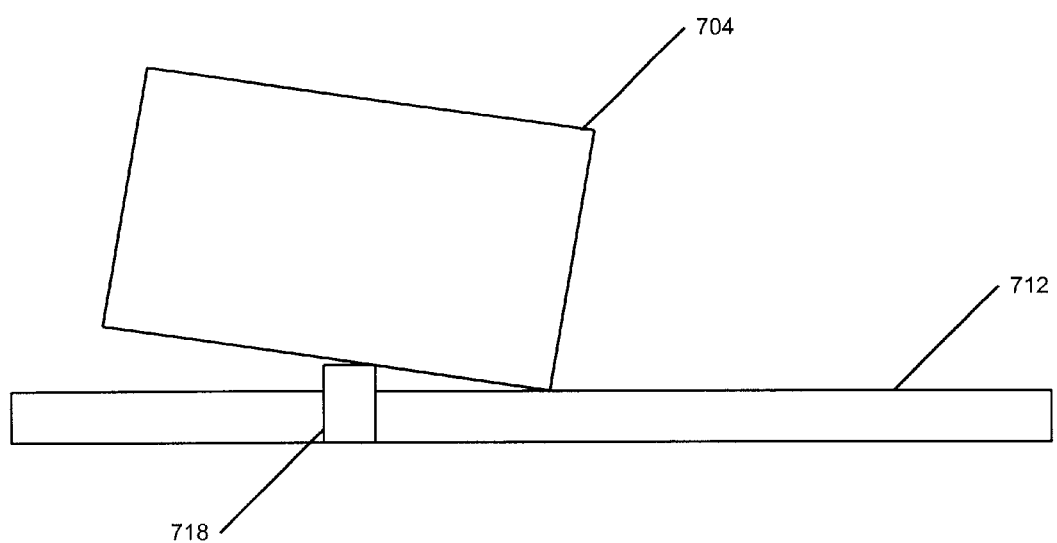

FIG. 15C is a schematic diagram of a misaligned image print as it passes the sensor of FIG. 14.

Figure 15D:
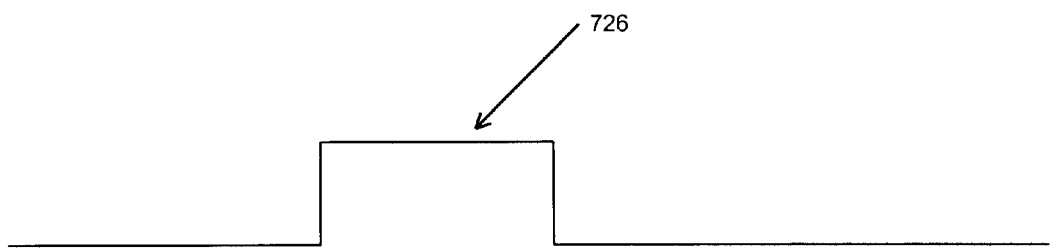

FIG. 15D is an example of a signal that is produced as a result of the image print of FIG. 15C.

Figure 16:
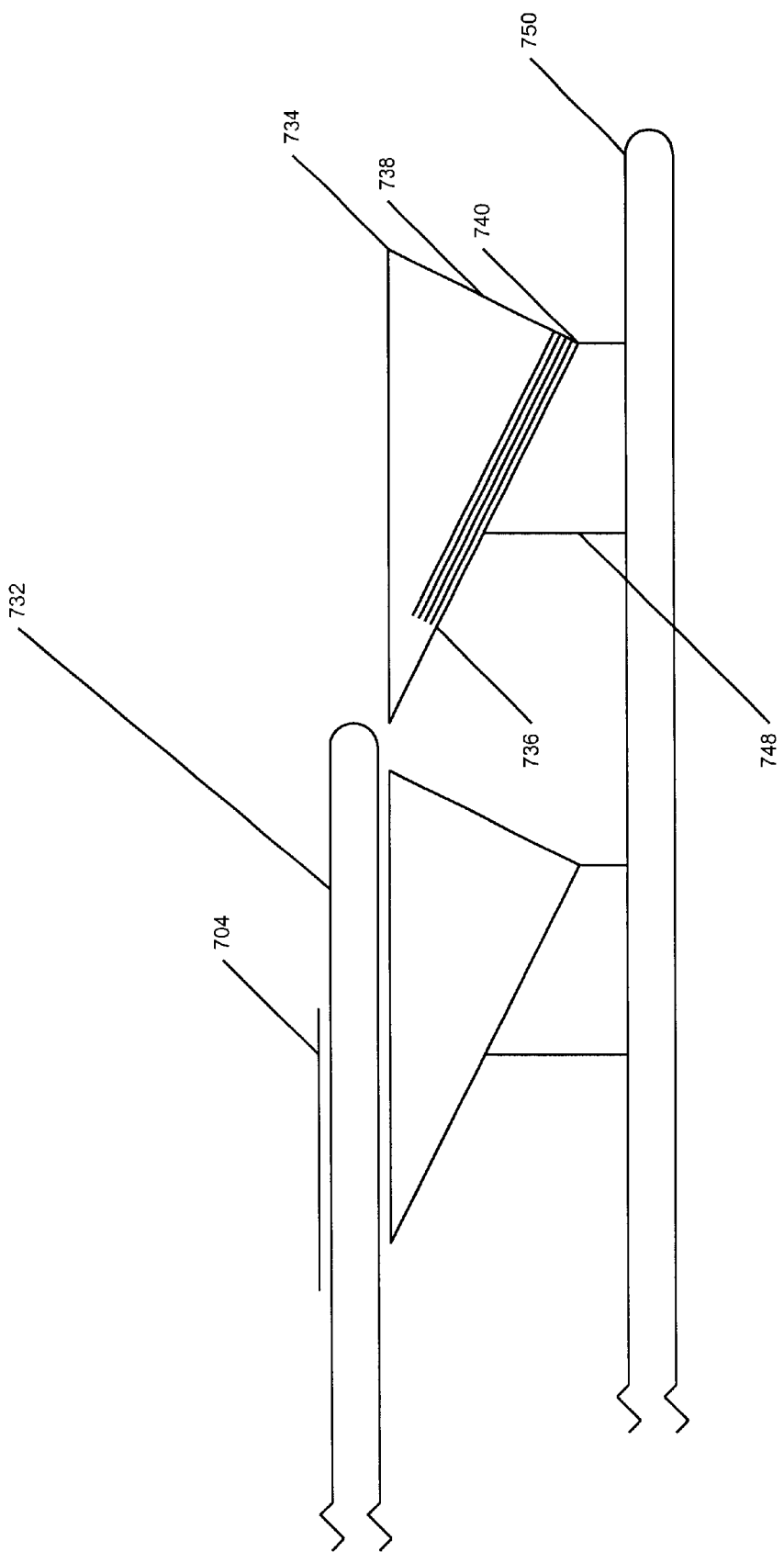

FIG. 16 is a schematic diagram of binning equipment that can be used in the print lab system of FIG. 9.

Figure 17:
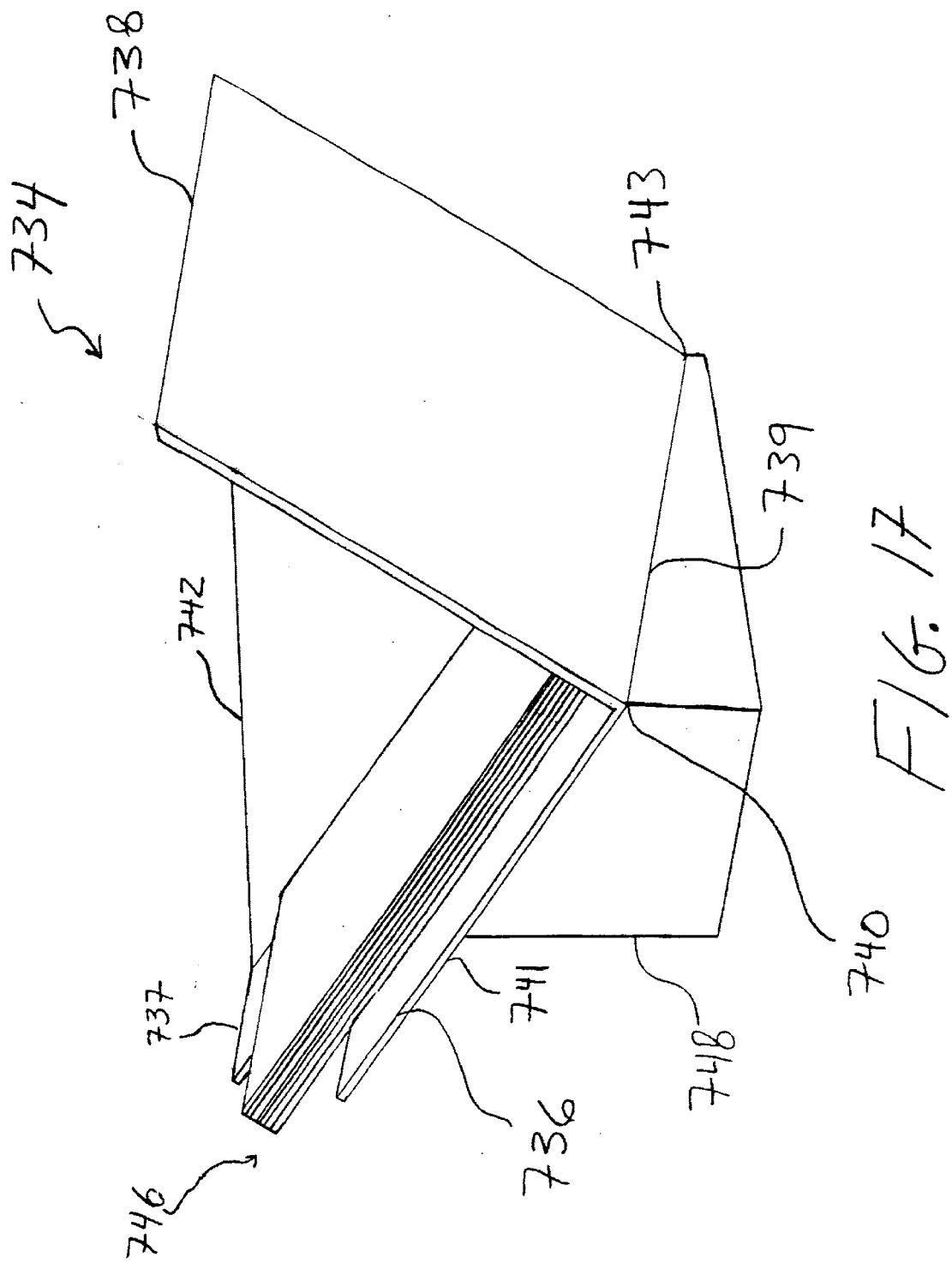

FIG. 17 is a perspective diagram of the bin shown in FIG. 16.

Figure 18:
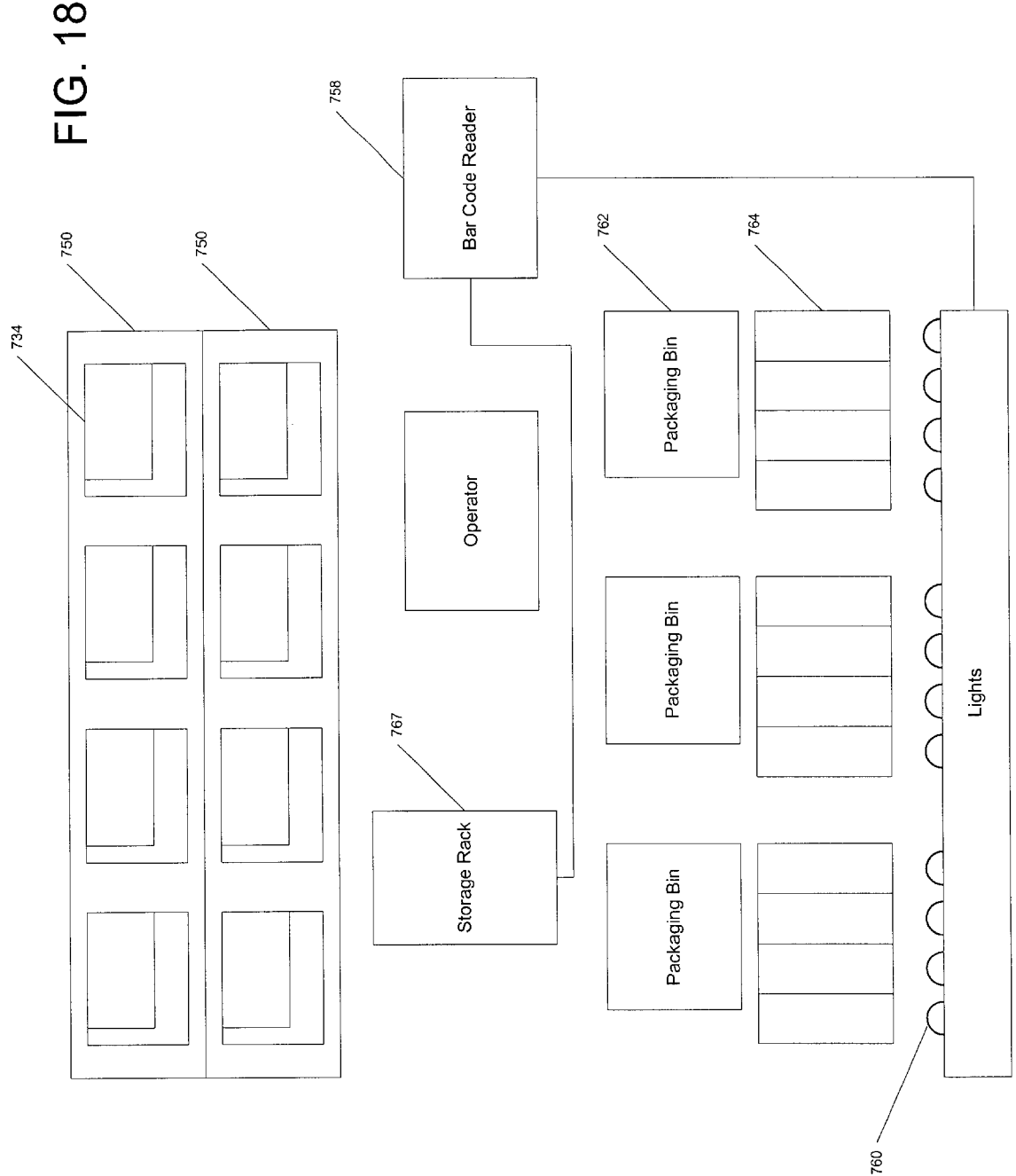

FIG. 18 is a block diagram of packaging, shipping, and storage equipment that can be used in the print lab system of FIG. 9

Figure 19:
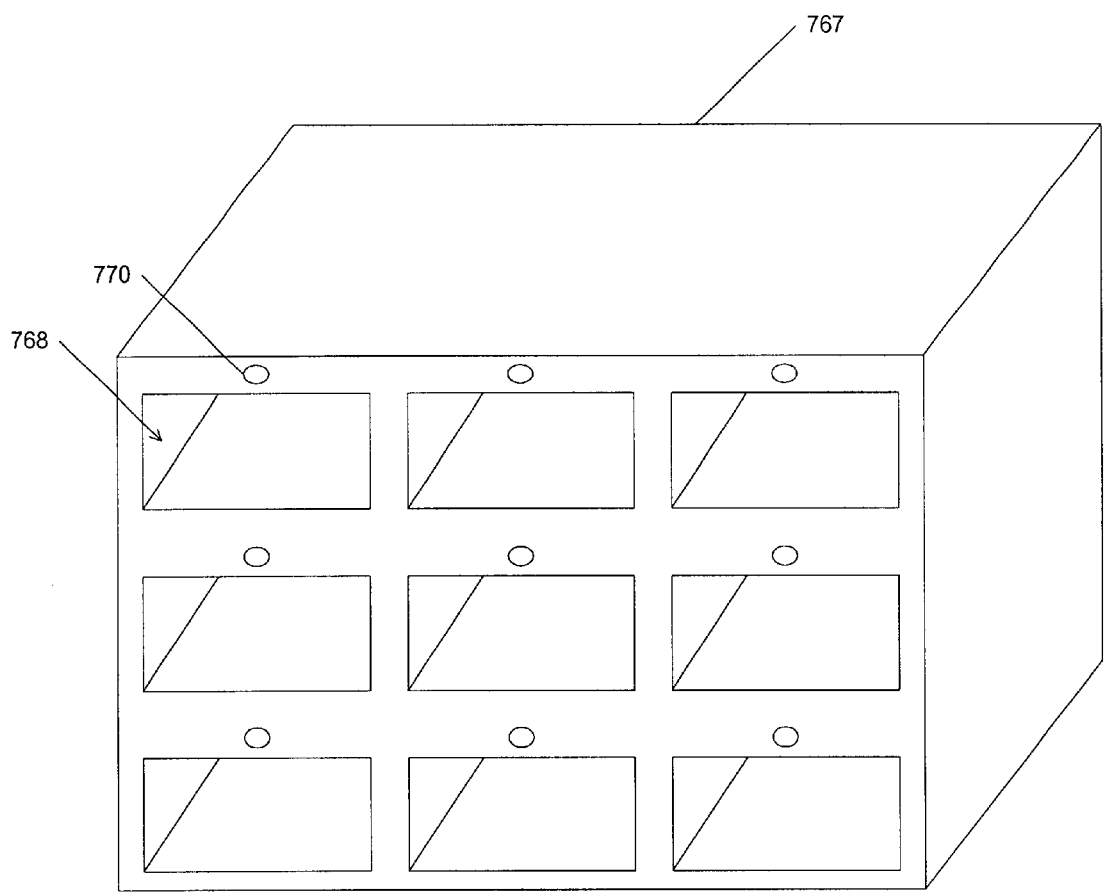

FIG. 19 is perspective diagram of a storage rack that can be used in the print lab system of FIG. 9.

Figure 20:
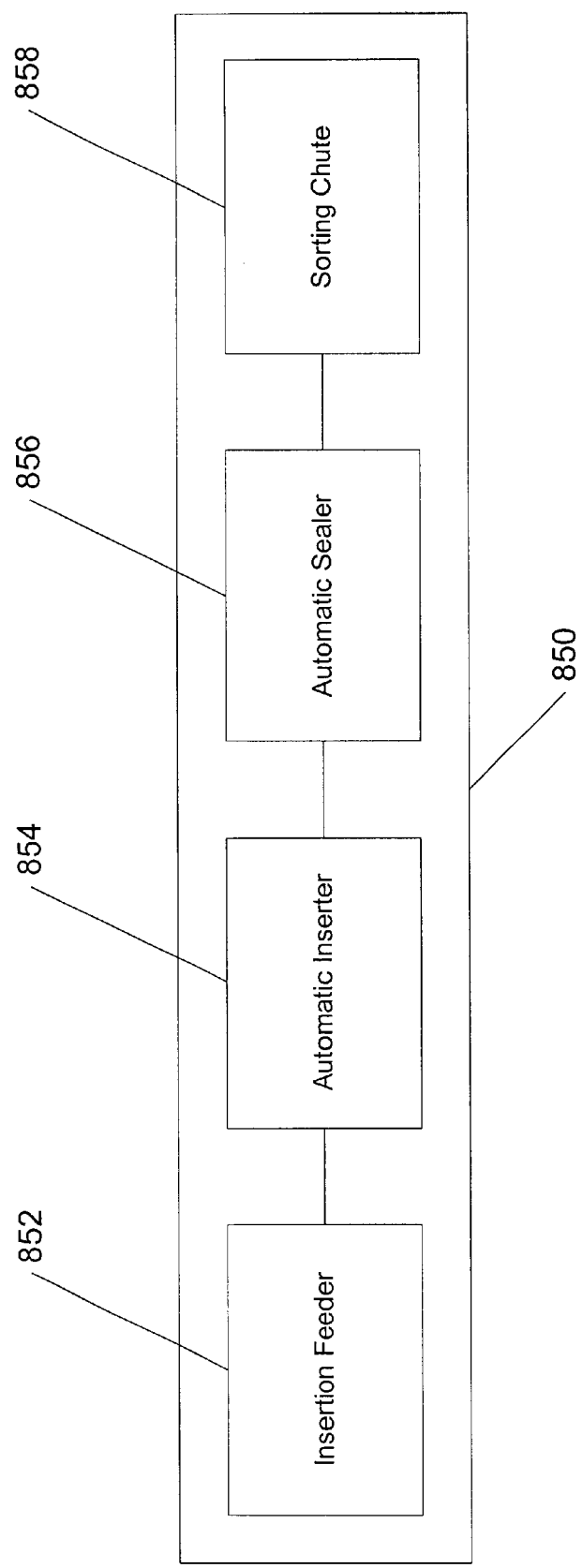

FIG. 20 is block diagram of an automated insertion system that can be used in the print lab system of FIG. 9.

Figure 21:
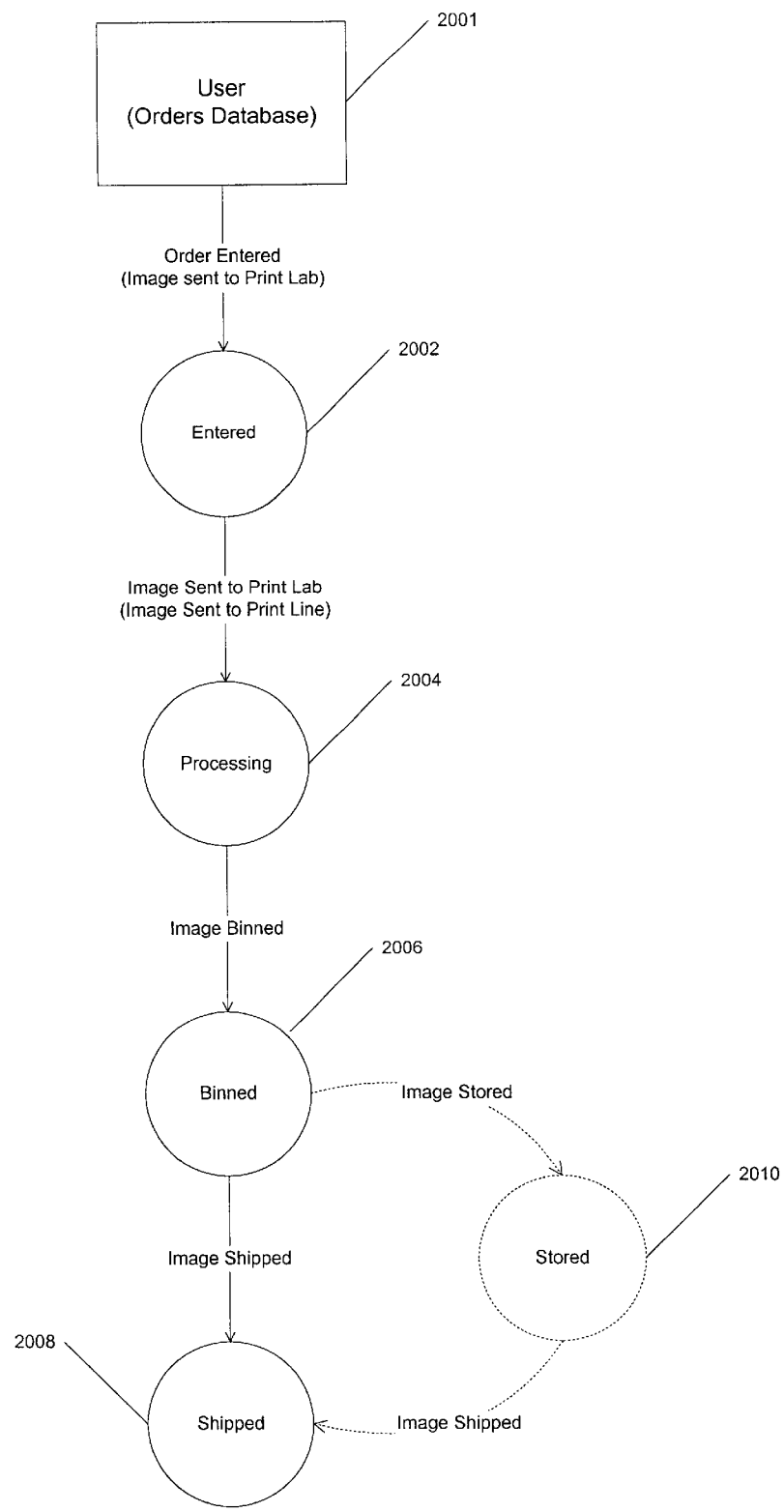

FIG. 21 is state diagram showing of states that are tracked in the print lab system of FIG. 9.

Figure 22:
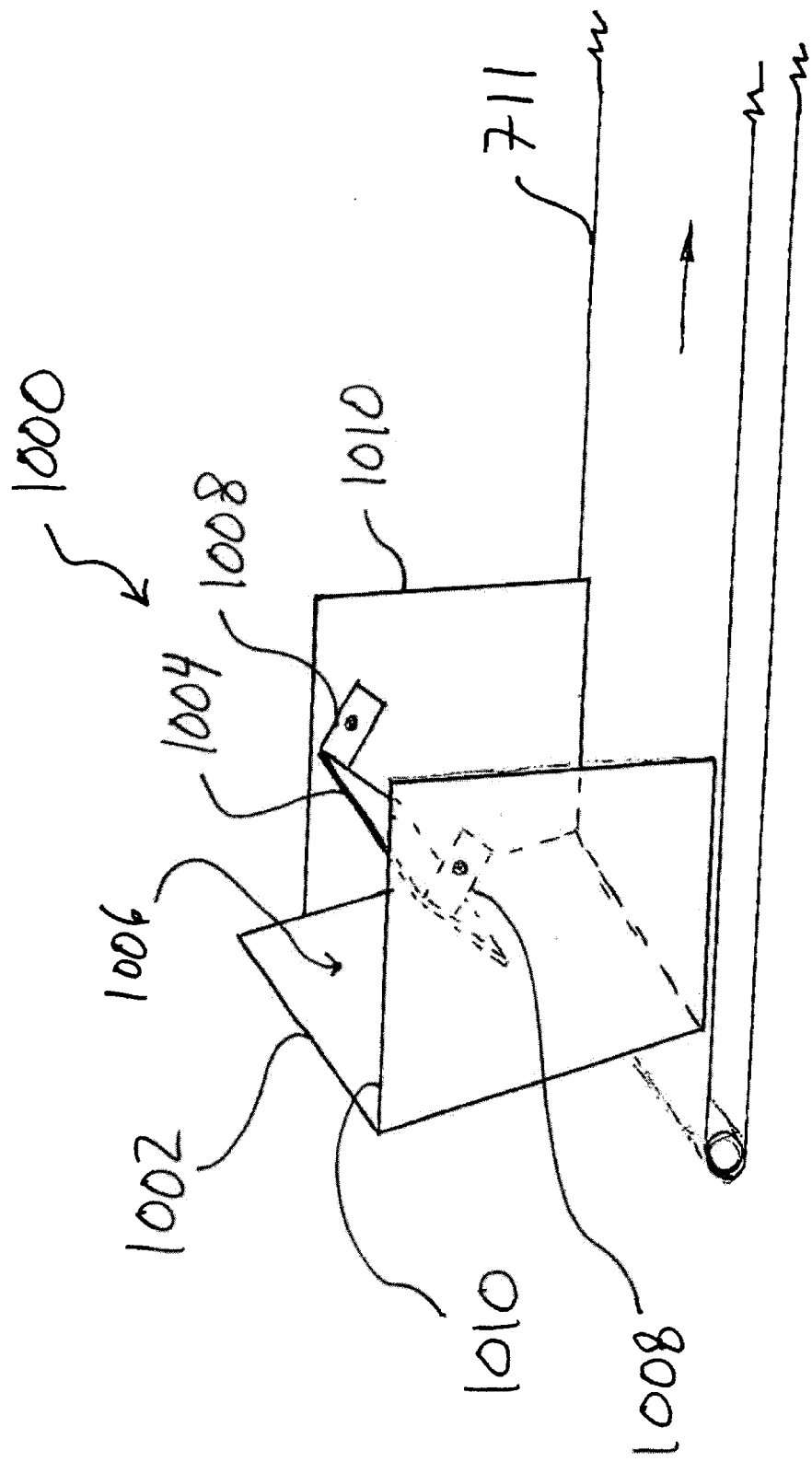

FIG. 22 is a perspective diagram of an inverter that can be used in the print lab system of FIG. 9.

Figure 23:
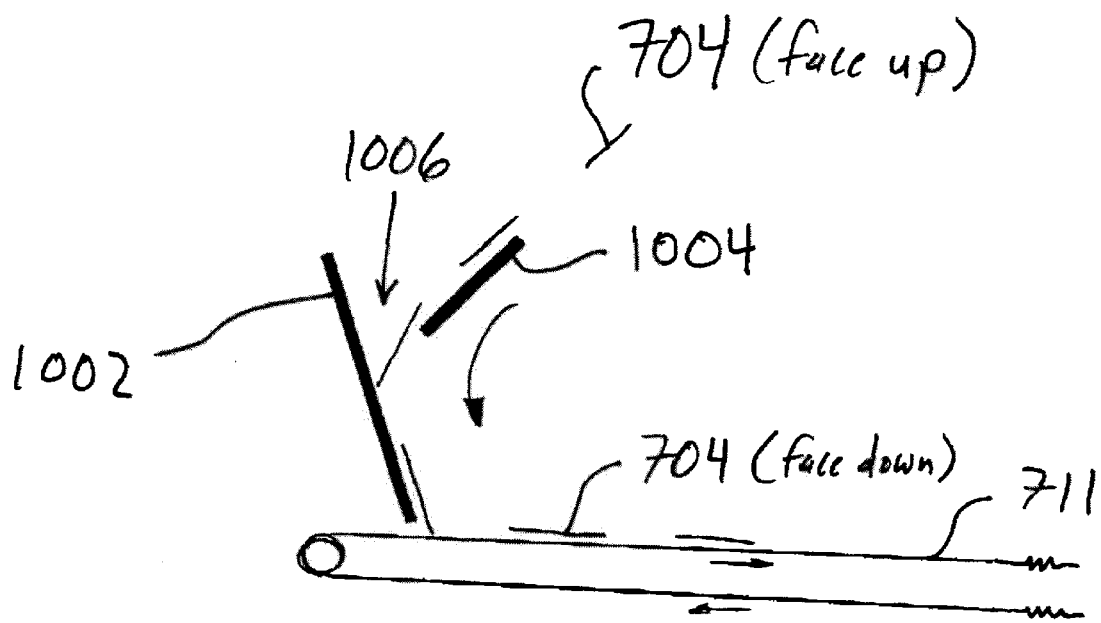

FIG. 23 is a side view of the inverter of FIG. 22.

Figure 24:
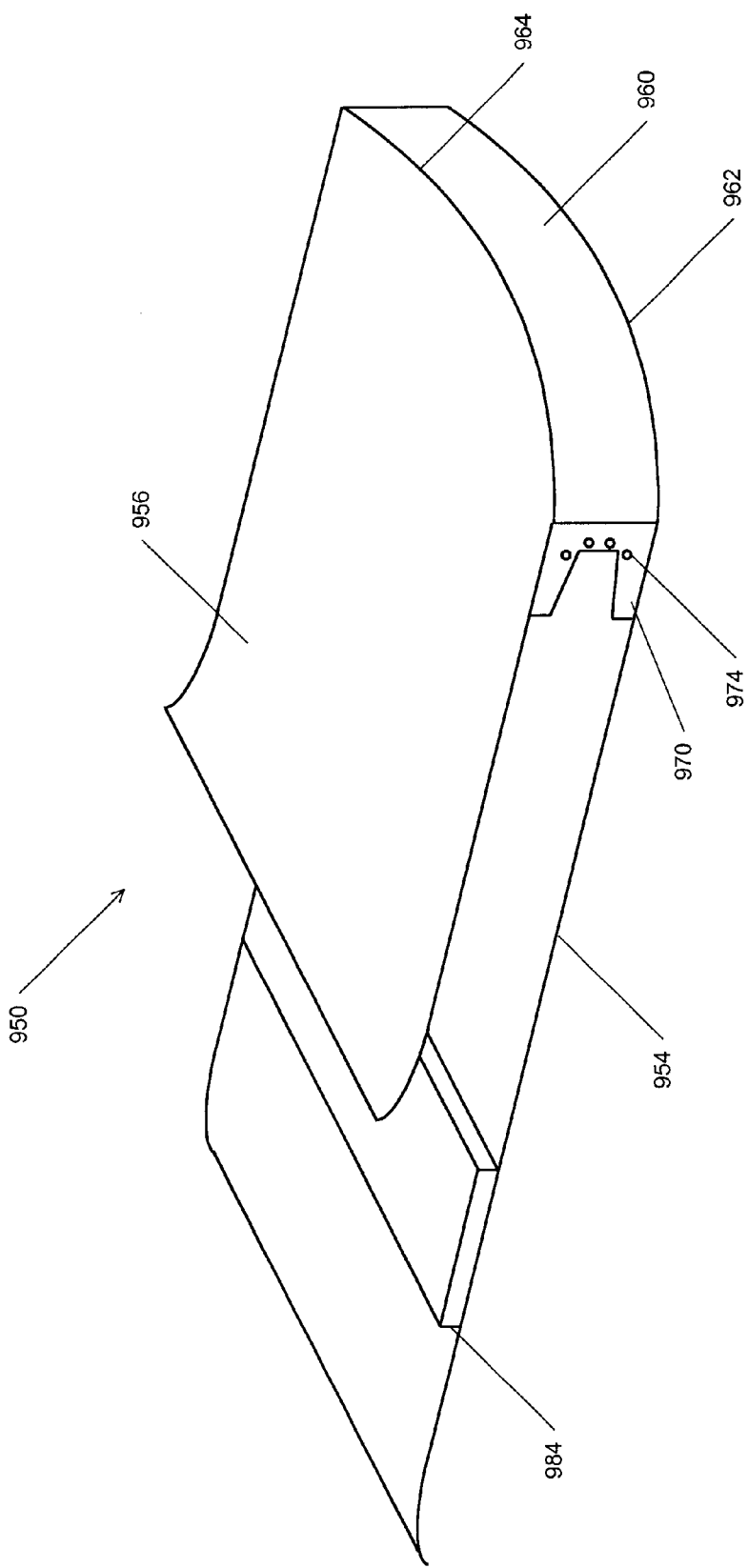

FIG. 24 is a perspective view of an inverter that can be used in the print lab system of FIG. 9.

Figure 25:
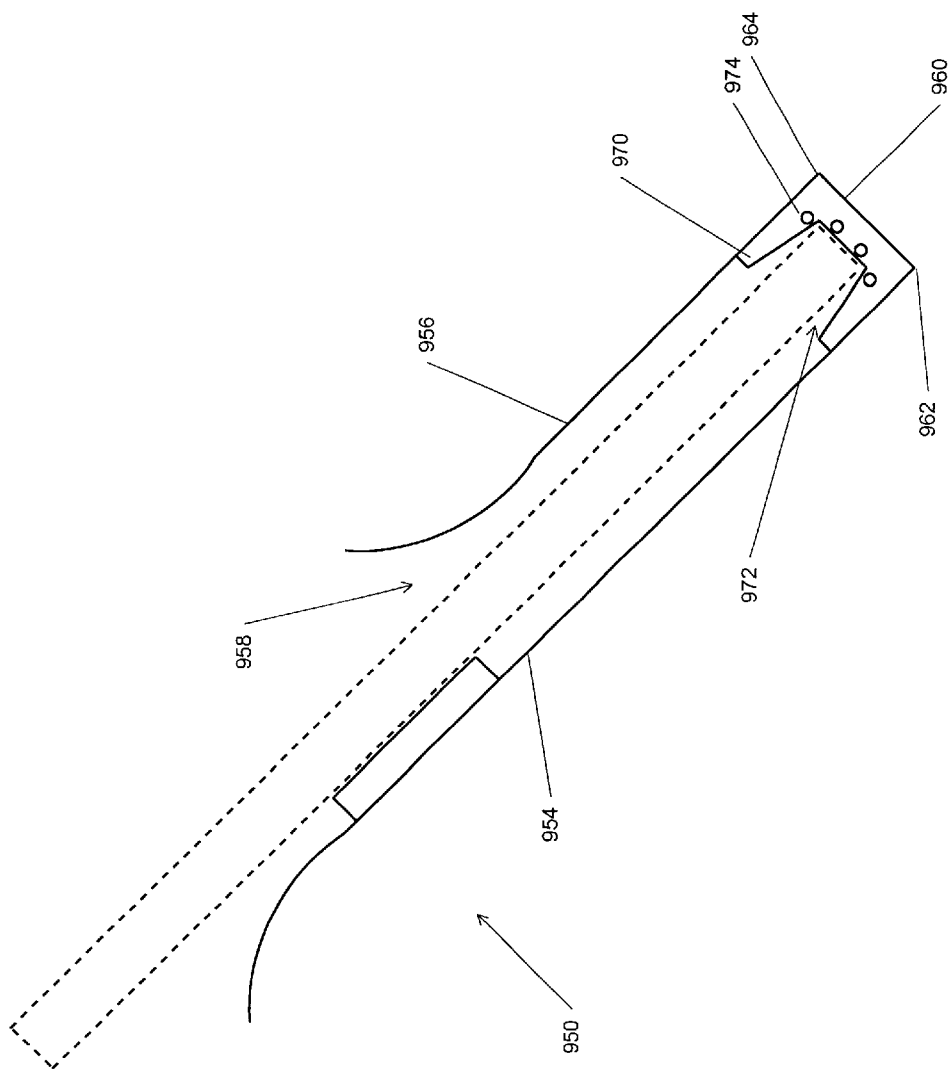

FIG. 25 is a side view of the inverter of FIG. 24.

Figure 26:
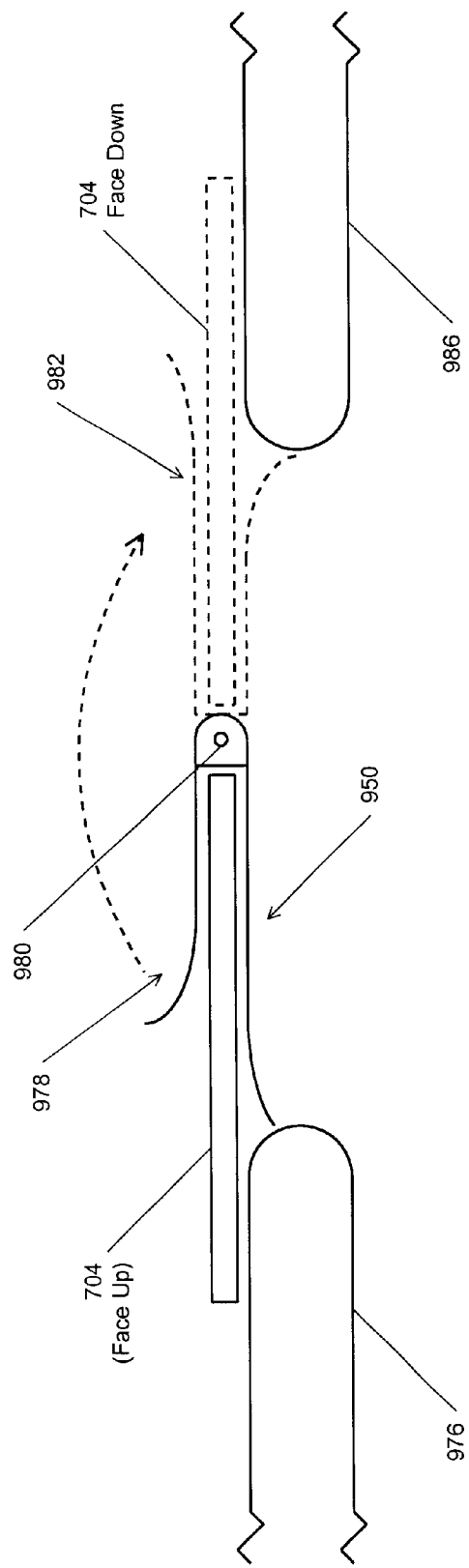

FIG. 26 is a schematic diagram illustrating the operation of the inverter of FIG. 24.

Like reference numbers and designations in the various drawings indicate like elements.

DETAILED DESCRIPTION

Figure 1:
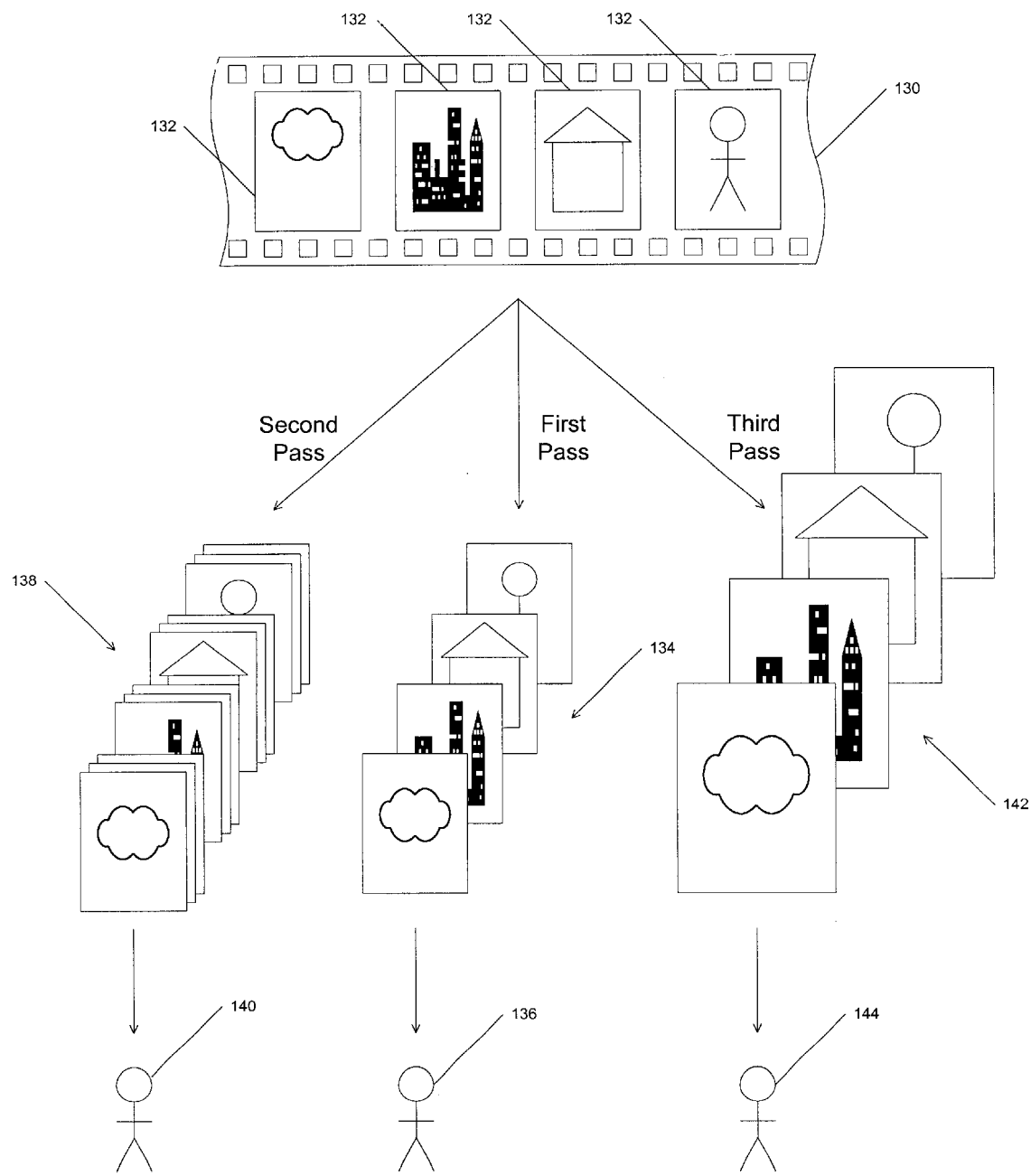
FIG. 1 is diagram illustrating a linear process of printing images.
Figure 2:
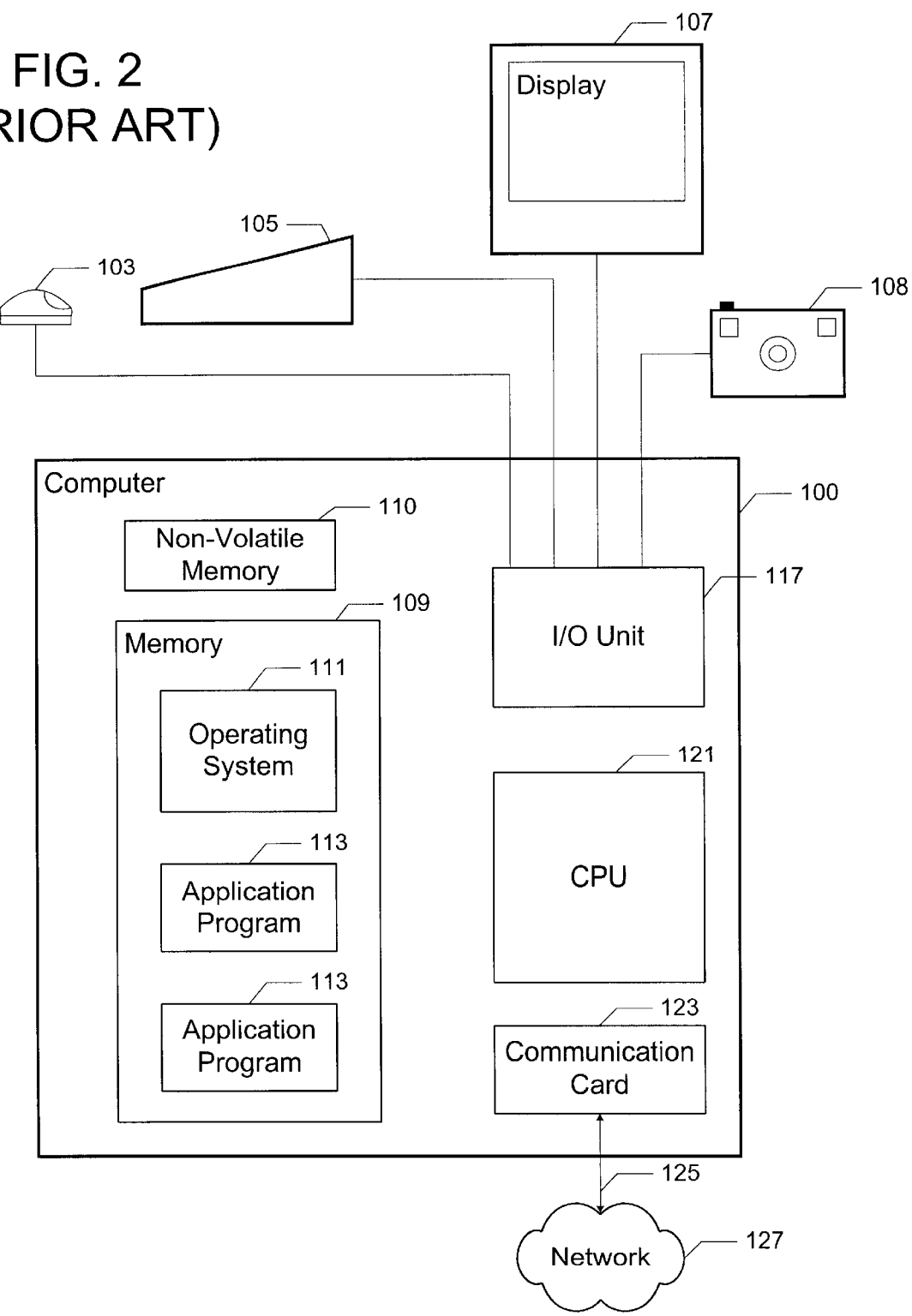
FIG. 2 is a block diagram showing a typical computer architecture.
Figure 3A:
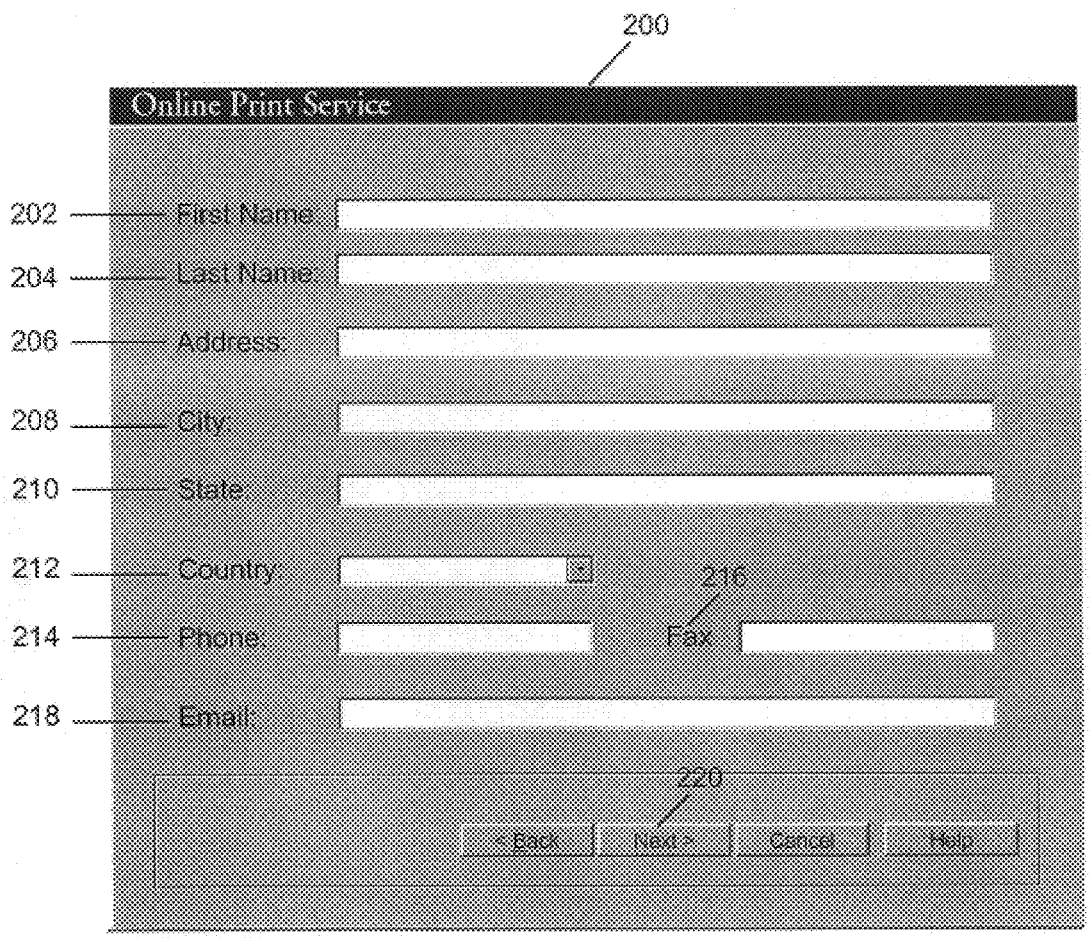
FIGS. 3A–3F show a series of typical display windows that a user might encounter when ordering image prints online.
Figure 3B:
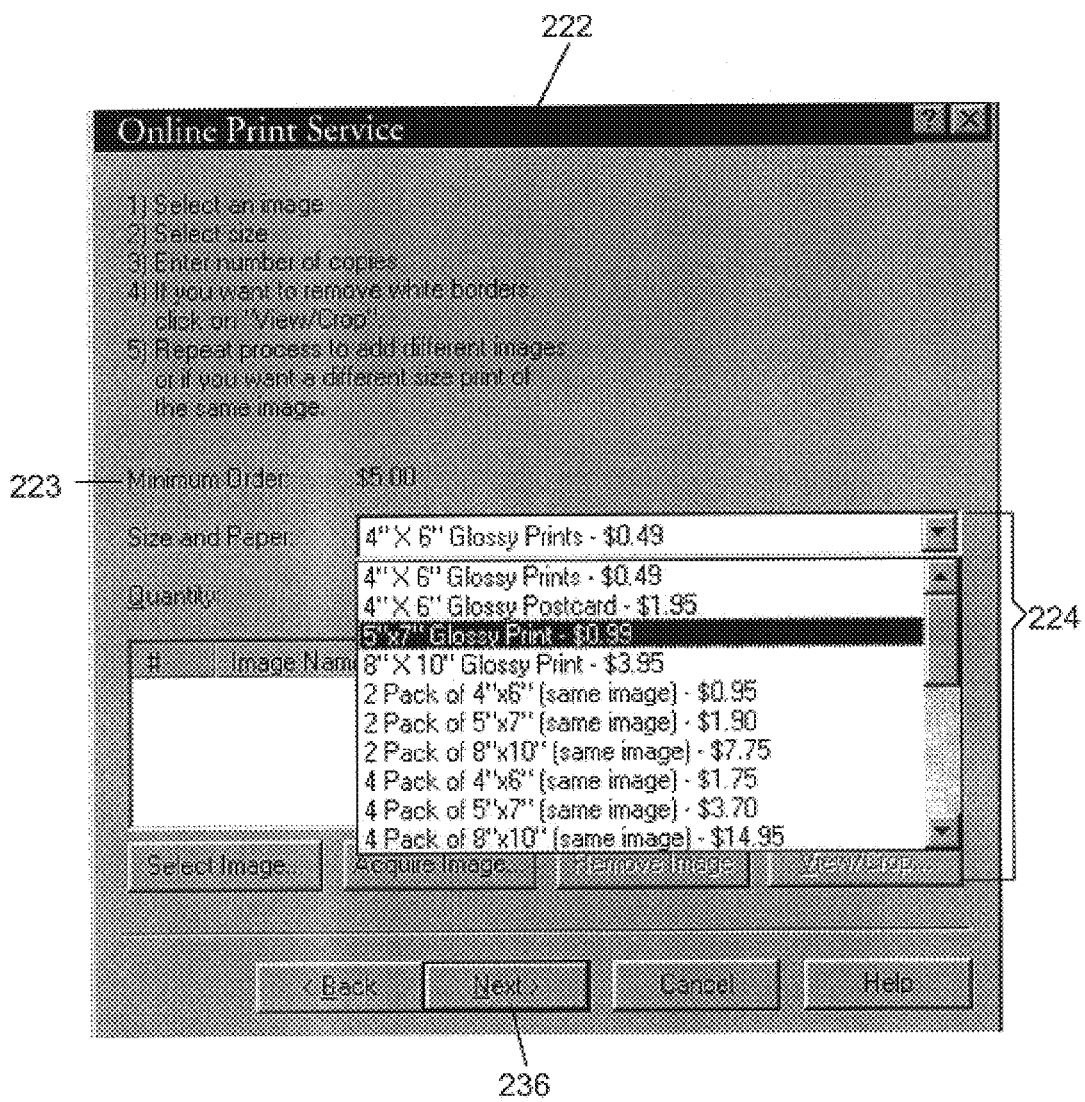
Figure 3C:
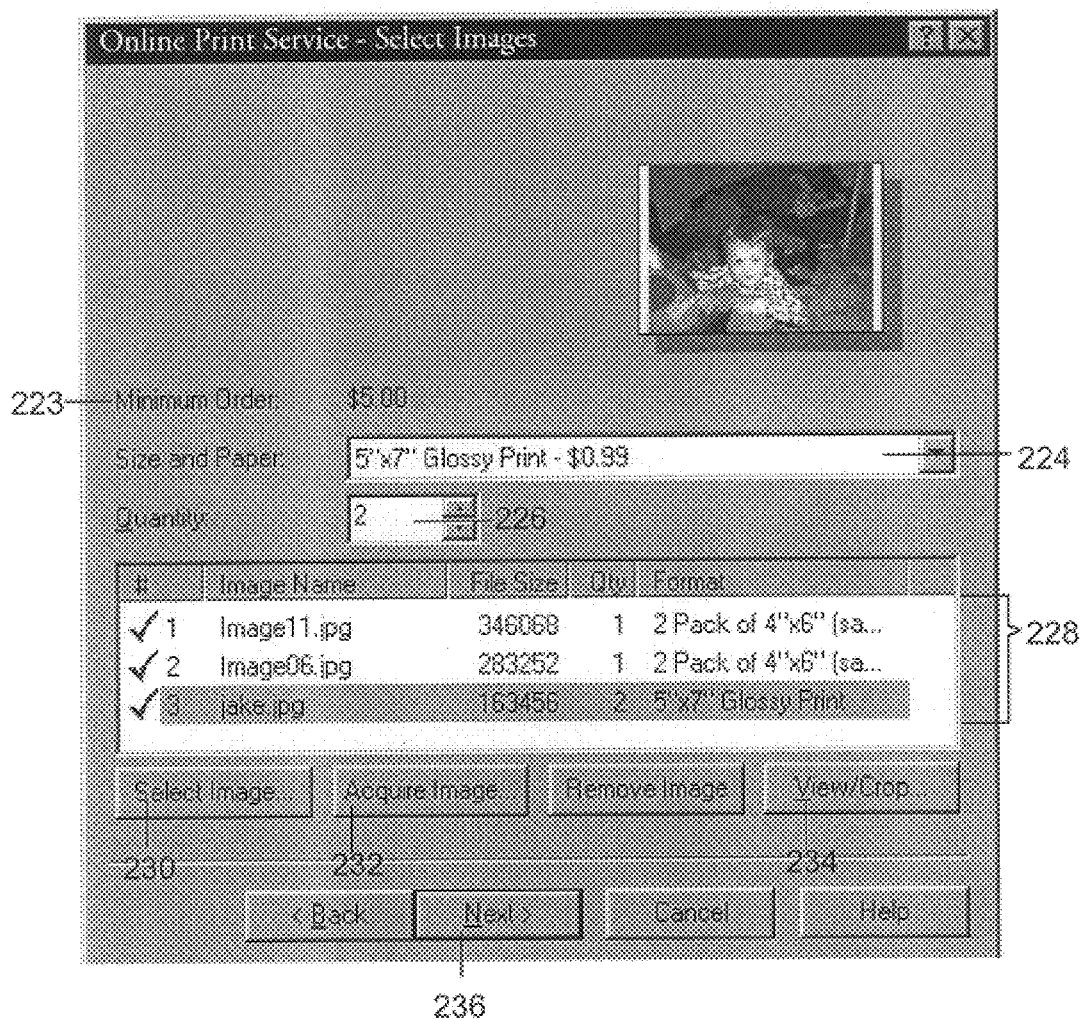
Figure 3D:
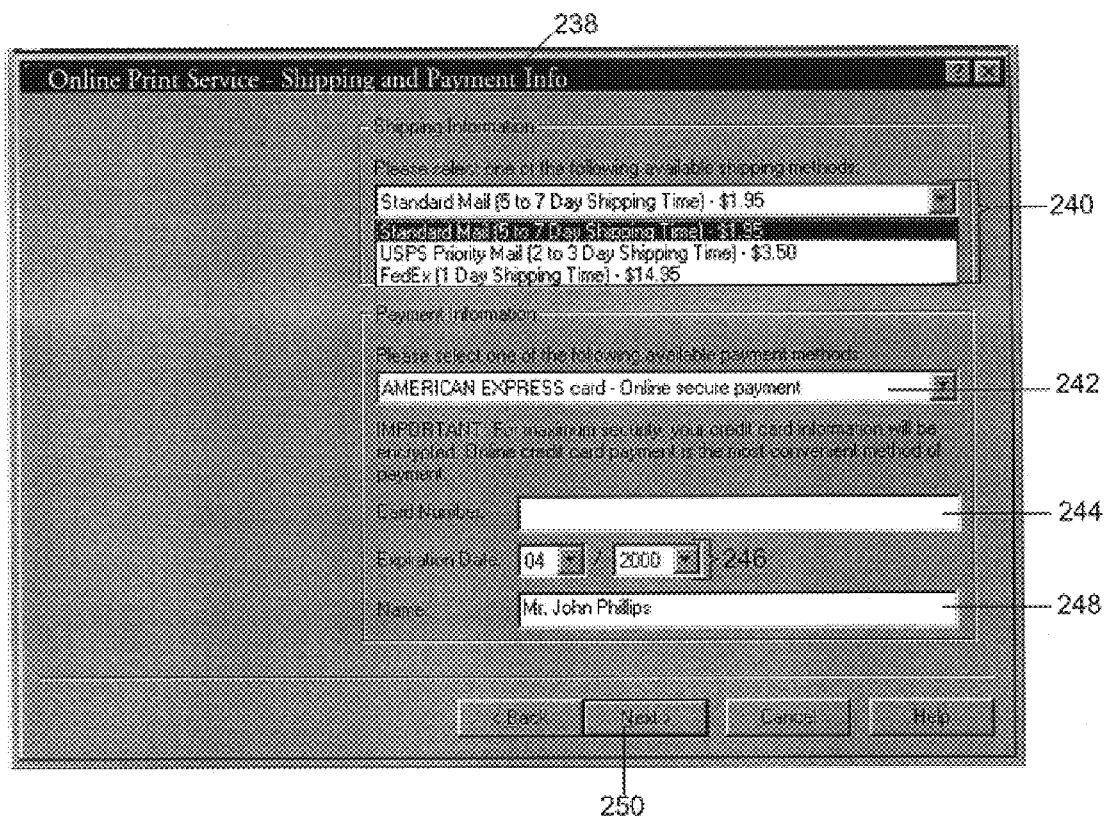
Figure 3E:
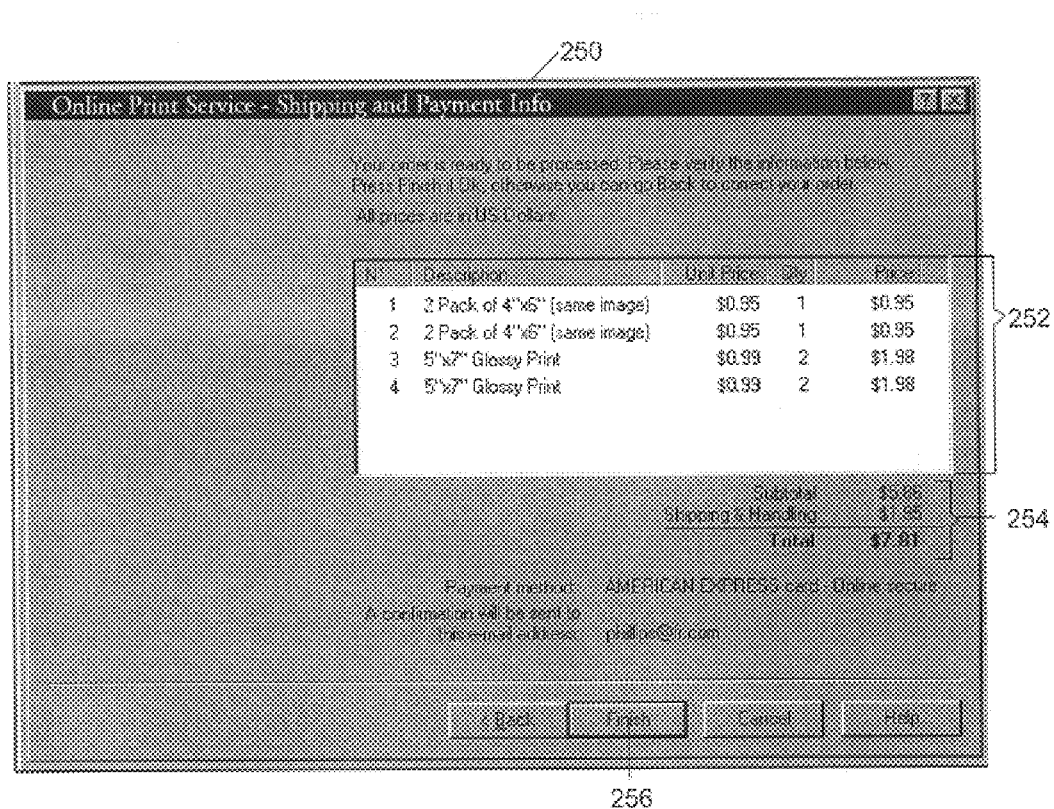
Figure 3F:
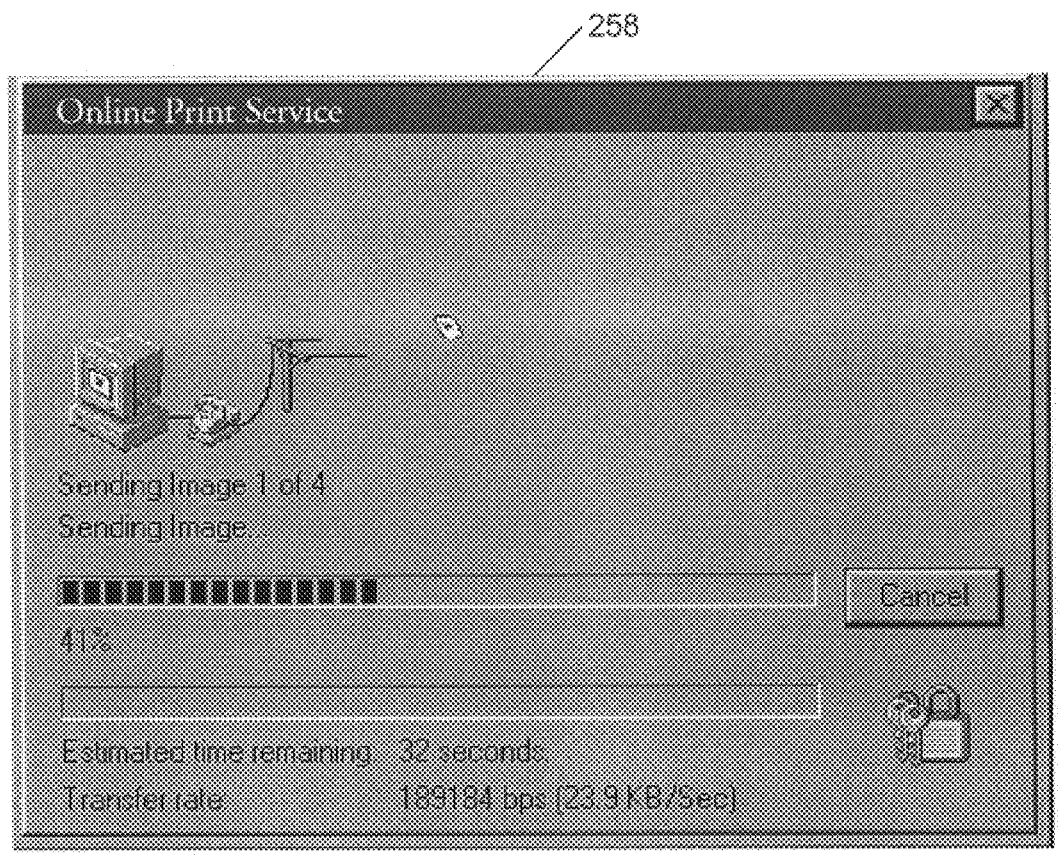
Figure 4A:
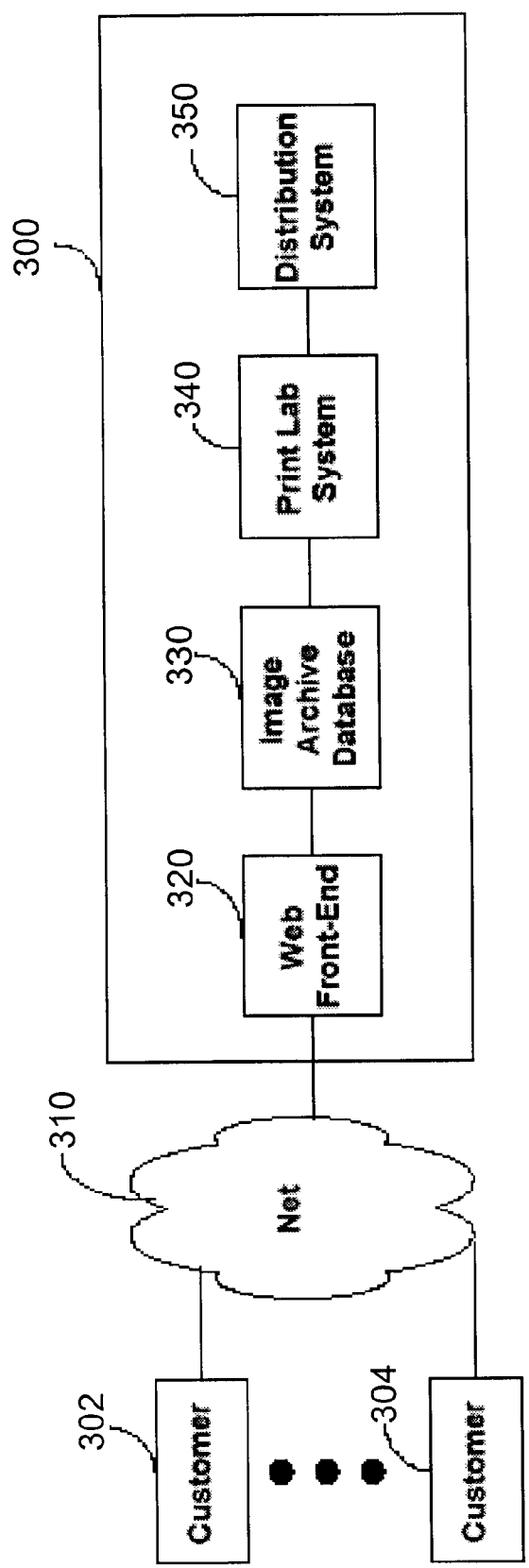
FIG. 4A is a block diagram of a system for making and distributing image prints.

FIG. 4A is a block diagram of one deployment of a print generation and distribution system 300. In general, the system of FIG. 4A enables users to transmit images to a photo-finisher and then order prints of those images to be sent to one or more recipients. In FIG. 4A, one or more customers 302–304 communicate with the system 300 over a wide area network 310 such as the Internet. In one embodiment, the system 300 stores digital images that have been submitted by the customers 302–304 over the Internet for subsequent printing and delivery to designated recipients.

The system 300 has a web front-end computer system 320 that is connected to the network 310. The web front-end computer system 320 receives customer input or requests from the network 310 and communicates the received information to an image archive database 330. The image archive database 330 captures images submitted by the customers 302–304 and archives these images for rapid retrieval when needed. The information stored in the image archive database 330 in turn is provided to a print laboratory system 340 for generating high resolution, high quality photographic prints. The output from the print lab system 340 in turn is provided to a distribution system 350 that delivers the physical prints to the customers 302–304 and/or to their respective designated recipients. Further details on the print generation and distribution system are provided in U.S. patent application Ser. No. 09/428,871, filed Oct. 27, 1999, and entitled "Multi-Tier Data Storage System," which is incorporated by reference.

Although the print lab system 340 and the distribution system 350 are represented as separate boxes in FIG. 4A, in various implementations they can be integrated in whole or in part. For example, the print lab system 340 can be designed to generate prints in a manner and/or in an order that readily facilitates physical shipment of the prints to their respective ultimate destinations. (As used herein, "destination" is used to include a shipping address, for example, a post office address for an enterprise or an individual, and/or a name of a specific individual or group of individuals residing at a given shipping address.) In one implementation, a single print order received at the web front-end 320 could be divided into sub-orders, each of which corresponds to a set of prints to be generated and delivered to a separate destination address and/or intended recipient. Then, for each order, the print lab system 340 could create multiple instances of images and rearrange them as needed to build the constituent sub-orders. Each sub-order then is sent to the printing system to generate a separate run of prints for the recipient associated with the sub-order under consideration.

In general, this process of instantiating multiple image instances and re-ordering those instances as appropriate to build sub-orders represents a non-linear workflow model which, among other advantages, enables a user, through a single print order (delimited, for example, by a single transaction sequence and/or a single credit or debit card charge), to specify multiple different recipients, each of whom can receive his or her own personalized set of prints in which each can be generated according to customizable parameters (e.g., size, number of copies, finish, personal message, etc.). In addition, the non-linear workflow can cause a dramatic increase in the efficiency and/or speed with which prints can be generated and distributed to one or more recipients.

Figure 4B:
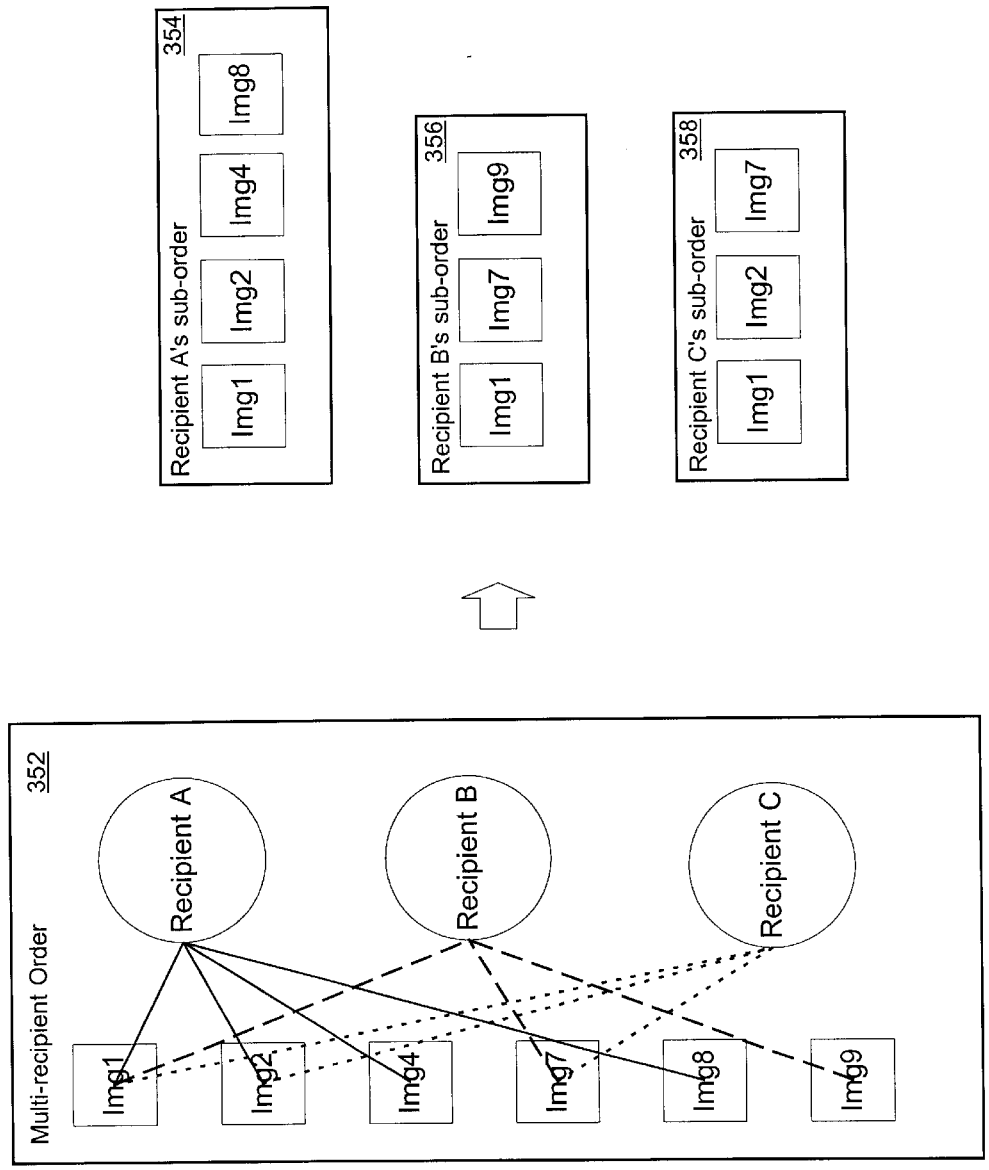
FIG. 4B is a diagram illustrating a non-linear workflow for instantiating multiple instances of images and re-arranging them into sub-orders.

FIG. 4B illustrates an example of a non-linear workflow in which sub-orders are generated from a print order specifying multiple recipients. In this example, assume that a user places an order 352 for prints (for example, by creating associations between images and recipients) identifying three different recipients A, B, and C, each of whom is to receive a set of prints selected from images 1–10. In this example, assume that Recipient A is to receive prints of Images 1, 2, 4 and 8 (Recipient A's image associations are indicated by solid lines), Recipient B is to receive prints of images 1, 7 and 9 (Recipient B's image associations are indicated by dashed lines) and Recipient C is to receive prints of Images 1, 2 and 7 (Recipient C's image associations are indicated by dotted lines). The images 1, 2, 4, 7, 8, and 9 in print order 352 are then instantiated and re-organized as appropriate to generate, or build, three separate sub-orders 354, 356, 358—one for each of the three different recipients A, B, C, respectively. Each of these sub-orders in turn is sent to the printing system to generate a contiguous run of prints for the associated recipient.

According to this example, Image 1 would be instantiated three times, once for each of the three different print sub-orders 354, 356, and 358 in which it is included (that is, each of Recipients A, B, and C is to receive a print of Image 1). Similarly, Image 2 would be instantiated twice (one instance for Recipient A's sub-order 354 and another instance for Recipient C's sub-order 358), as would Image 7 (one instance for Recipient B's sub-order 356 and another instance for Recipient C's sub-order 358). Each of the remaining images (4, 8 and 9) would be instantiated only once because in each case the image is being printed for, and sent to, only a single recipient (equivalently, is part of a single sub-order). As the images are instantiated according to the various sub-orders for which they are required, the image instances are inserted into a sub-order sequence, which when completely built, can be sent to the printer to generate a corresponding run of prints.

In one implementation, a sub-order requires only a single instance of each image to be sent to the printer even if multiple copies (and/or prints of varying sizes and/or finishes) of the image are to be printed. This is because the printer can be instructed by a control system to print multiple copies of a single image on an individual image basis. Alternatively, if the system designer found it desirable to do so, a sub-order could include multiple instances of an image, one instance for each different copy of that image to be printed. Although this generally would result in larger sub-orders that required more memory and/or storage space, it could potentially simplify the print generation control process. However, if a sub-order requests that a given image be image processed in two or more different ways before printing (e.g., specifying that one copy of the image be processed by applying a soft-focus filter to the image and that another copy of the same image be processed without applying the soft-focus filter), then the sub-order should include multiple, different instances of the image.

Typically each run of prints (corresponding to a separate sub-order) is preceded (or followed) by a destination identifier, for example, a print that includes the name and address of the intended recipient for the run under consideration. This destination identifier separates adjacent runs and provides a convenient delimiter and/or address label to allow the distribution system 350 to package up runs of prints quickly and efficiently and to initiate delivery of them to their respective intended recipients.

Figure 5:
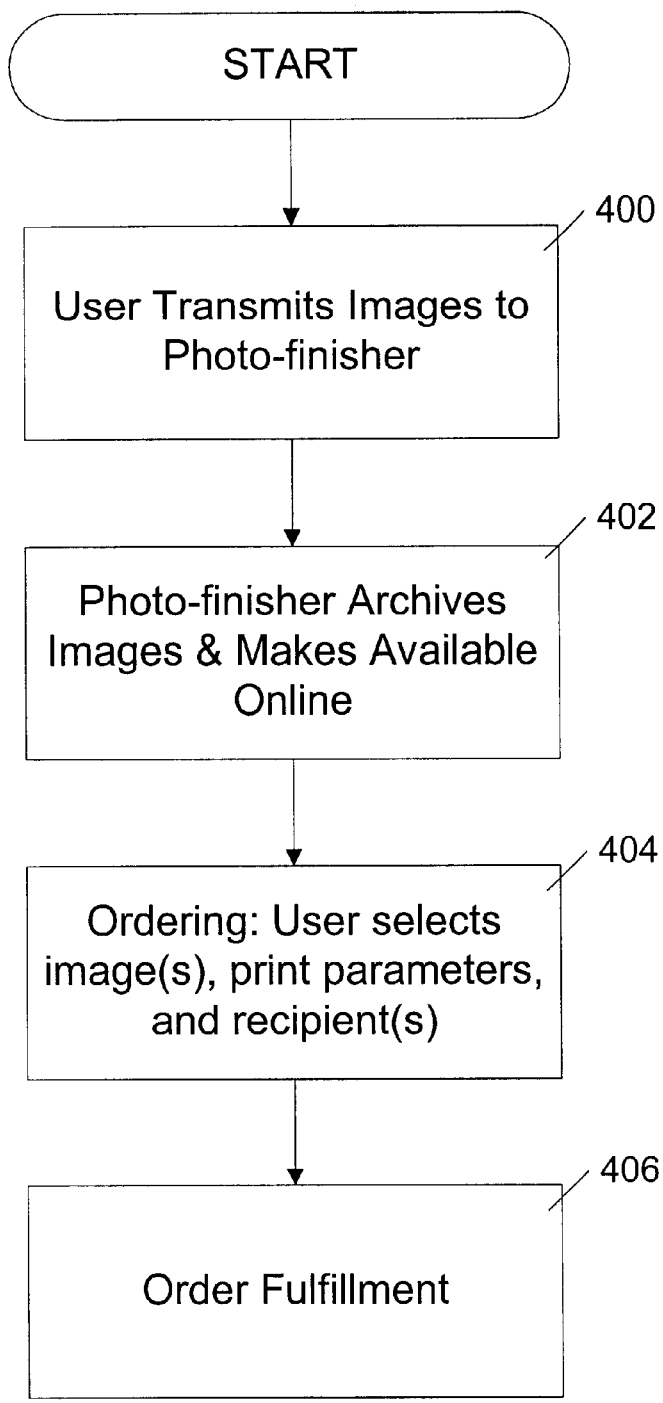
FIG. 5 is a flowchart of distributing image prints to multiple destinations.

FIG. 5 is a flowchart of a process that allows a user to transmit images to a photo-finisher and then order prints of those images to be sent to one or more recipients. In general, the print generation and multi-recipient distribution process of FIG. 5 is oriented to an image, or set of images, of which a user desires to distribute prints to a group of one or more recipients. That is, a user's print order is delimited by a set of images selected by the user and not by the number or location of recipients to receive the prints.

Before the user can order prints, the user's images first are transmitted to the photo-finisher (step 400). Such transmission of images can be accomplished in any of several different manners. For example, if the images have been generated with a digital camera or any of various computer software (e.g., a graphics program such as Adobe Photoshop) or hardware devices (e.g., scanner), then the user has the option of transmitting the digital image files to the photo-finisher's host computer, for example, over a computer network such as the Internet. Any available protocol (FTP, HTTP, etc.) or electronic communication application (e.g., e-mail, special-purpose software provided by the photo-finisher) could be used for this purpose.

Alternatively, the digital images first could be stored on a physical storage medium (a floppy disk, a read/write CD-ROM, a Flash memory card, etc.) and then sent to the photo-finisher's place of business by U.S. mail or overnight courier. The photo-finisher then could read the images from the storage medium and return it to the user, potentially in the same package as the user's print order. In addition, the photo-finisher could load data or programs for the user's benefit onto the storage medium before returning it to the user. For example, the photo-finisher could load the storage medium with image viewing or editing software to allow the user to better manage images. The photo-finisher also could load calibration or control data onto the storage medium, which the user could load onto his or her computer to be able to view the images, or print them on a local printer, with improved color accuracy. Alternatively, or in addition, if the storage medium was, for example, a FLASH memory card of the type used in certain models of digital cameras sold (e.g., SmartMedia™ or CompactFlash™), then the photo-finisher could load control data or driver programs on to the FLASH memory card that, when loaded into the digital camera, would modify its behavior, for example, to enhance color accuracy or other performance characteristics. Typically, storing data on a FLASH memory card in this manner to modify digital camera behavior would require cooperation from, and/or a business arrangement with, one or more digital camera manufacturers.

If the images originate from physical photographic media (e.g., exposed film, previously processed negatives, prints), then the user could send the desired items to the photo-finisher, which would, for example, develop the exposed film and scan the resulting prints or negatives to produce corresponding digital image files. The capability to handle physical photographic media enables, for example, a user to send a collection of old prints and/or negatives to the photo-finisher, which could then scan the photographic media to generate digital images.

Another alternative for transmitting a user's images to the photo-finisher involves the use of a public entry terminal (also referred to variously as a "digital drop-box," a "point-of-sale (POS) station" and/or a "kiosk"). A public entry terminal essentially is a special-purpose computer system that is made publicly available (e.g., in a shopping mall, video arcade, supermarket, drug store, post office, etc.) and which is designed to capture users' image data. The public entry terminal typically would be in communication with the photo-finisher's host system, for example, over the Internet, a virtual private network or dedicated telephone line, and could transmit images captured from users to the photo-finisher's facility to have prints made.

For example, a public entry terminal placed at a drug store could have a slot that accepts removable storage media, such as a FLASH memory card. On insertion, the public entry terminal could read image files from the inserted storage medium. Alternatively, or in addition, the public terminal could include one or more data ports (e.g., a USB or SCSI port) through which users could upload images to the public terminal directly from their digital cameras. The uploaded image files could be displayed on a monitor to the user, who could then select images of which prints are desired, specify print parameters, and designate recipients for the prints. In addition, the public entry terminal could include application software or utilities that allow users to edit images as desired, for example, to resize or crop images, to change an image's orientation, to remove redeye, to modify the color characteristics, etc. In any event, after the user had uploaded his or her images and has specified the images to be printed and their respective intended recipients, the public entry terminal could formulate a corresponding order and forward it on the photo-finisher's host system to initiate fulfillment.

Such a public terminal also could include a scanner for creating digital image files by scanning a user's prints or negatives. After the digital image files had been generated, the user could proceed to view, manipulate and/or order prints in the manners described above. The public entry terminal potentially also could support various electronic payment and authorization mechanisms, for example, a credit or debit card reader in communication with a payment authorization center, to enable users to pay for their prints at the time of ordering.

However they are transmitted, after the photo-finisher is in possession of the user's digital images, the photo-finisher can make them available to the user online, for example, by hosting the images on a webpage at which the user can view and access the images using a browser application (step 402). The user accesses the photo-finisher's website to designate which of the images should be printed, parameters relating to printing (e.g., finish, size, number of copies), and one or more recipients to whom the prints are to be sent.

In addition to hosting the user's images on a webpage, the photo-finisher also can store the images in an archive (e.g., a database management system (DBMS)) so that the user, and/or others given authorization by the user, can access them at any time in the future. Such access might be desired to order additional prints or simply to be able to share an online photo album among specified users. With regard to the former (ordering additional prints), each print could be encoded on its back or front with a print re-order number that uniquely identifies the print and/or the particular recipient of the print. Such a print re-order number could be used by a print recipient to order additional copies of the print. For example, by maintaining an automatic telephone response system at the photo-finisher's facility, a print recipient could call a toll-free telephone number (also potentially printed on the print) associated with the automatic response system and punch in the unique re-order number for the print of which an additional copy is desired. Optionally, the user also could key in appropriate information using the telephone keypad to specify parameters for the re-ordered print (e.g., size, number of copies, finish). If no such optional print parameters were entered by the recipient, a default condition could be to use the parameters of the original print copy received by that recipient. In any event, the automatic response system could use the entered unique re-order number to generate an order for the particular print identified by the re-order number and then have the print delivered to the recipient identified by the re-order number.

With regard to access to an online photo album, such a historical image archive would provide a valuable asset to users because, unlike some other data types, the value of image data generally increases with time. In addition, maintaining an online archive of a user's images allows the user to access the images regardless of the user's location, and frees the user from having to use lots of disk space or other storage capacity to store the images locally.

After the user's images have reached the photo-finisher and have been made available online, the user can place an order with the photo-finisher (step 404). One way to place an order is by having the user view the images online, for example, with a browser and selectively designate which images should be printed. The user also will specify one or more recipients to whom prints should be distributed and, further, print parameters for each of the individual recipients, for example, not only parameters such as the size, number of copies and print finish, but potentially also custom messages to be printed on the back or front of a print. As used herein, the term "print" refers to any physical manifestation, or process for generating a physical manifestation, of graphical information. This includes of course photographic prints, but also any other item to which graphical information can be imparted, for example, greeting or holiday cards, books, calendars, playing cards, T-shirts, coffee mugs, mouse pads, key-chains, or any other type of gift or novelty item. Further details on how to allow a user to place an order are provided in U.S. patent application Ser. No. 09/436,704, filed Nov. 9, 1999, and entitled "Distributing Images to Multiple Recipients," which is incorporated by reference and from which priority is claimed.

After the prints, recipients and respective parameters have been specified, the user's order is fulfilled by making prints of the designated images and distributing them to the specified recipients (step 406). In general, fulfillment can be accomplished either by the photo-finisher itself or by another entity or company in cooperation with the photo-finisher. Potentially, the photo-finisher could have business arrangements with two or more different fulfillment companies, which could be dispersed geographically (at various locations around the country or world) to minimize shipping costs, labor costs and/or delivery time. Alternatively, or in addition, different fulfillment companies could be used which have different areas of expertise or production capability. For example, one fulfillment company could specialize in making standard photographic prints, another fulfillment company could specialize in printing greeting cards, yet another fulfillment company could specialize in generating T-shirts, and so on.

Distribution and delivery of the prints to recipients could be accomplished by any of various techniques. For example, standard U.S. Mail or courier services (e.g., Federal Express or UPS) could be employed. Alternatively, the photo-finisher could have a business arrangement with various other service or delivery companies to deliver print orders along with other regularly scheduled deliveries. For example, the photo-finisher could have a business arrangement with a delivery or service company (e.g., Webvan, an online grocer in the San Francisco Bay area, or Streamline, Inc., a goods/services/convenience portal head-quartered in the Boston area) in which the prints for a particular recipient would be generated on the delivery/service company's premises and then delivered either alone or along with that recipient's order of other goods/services.

Figure 6:
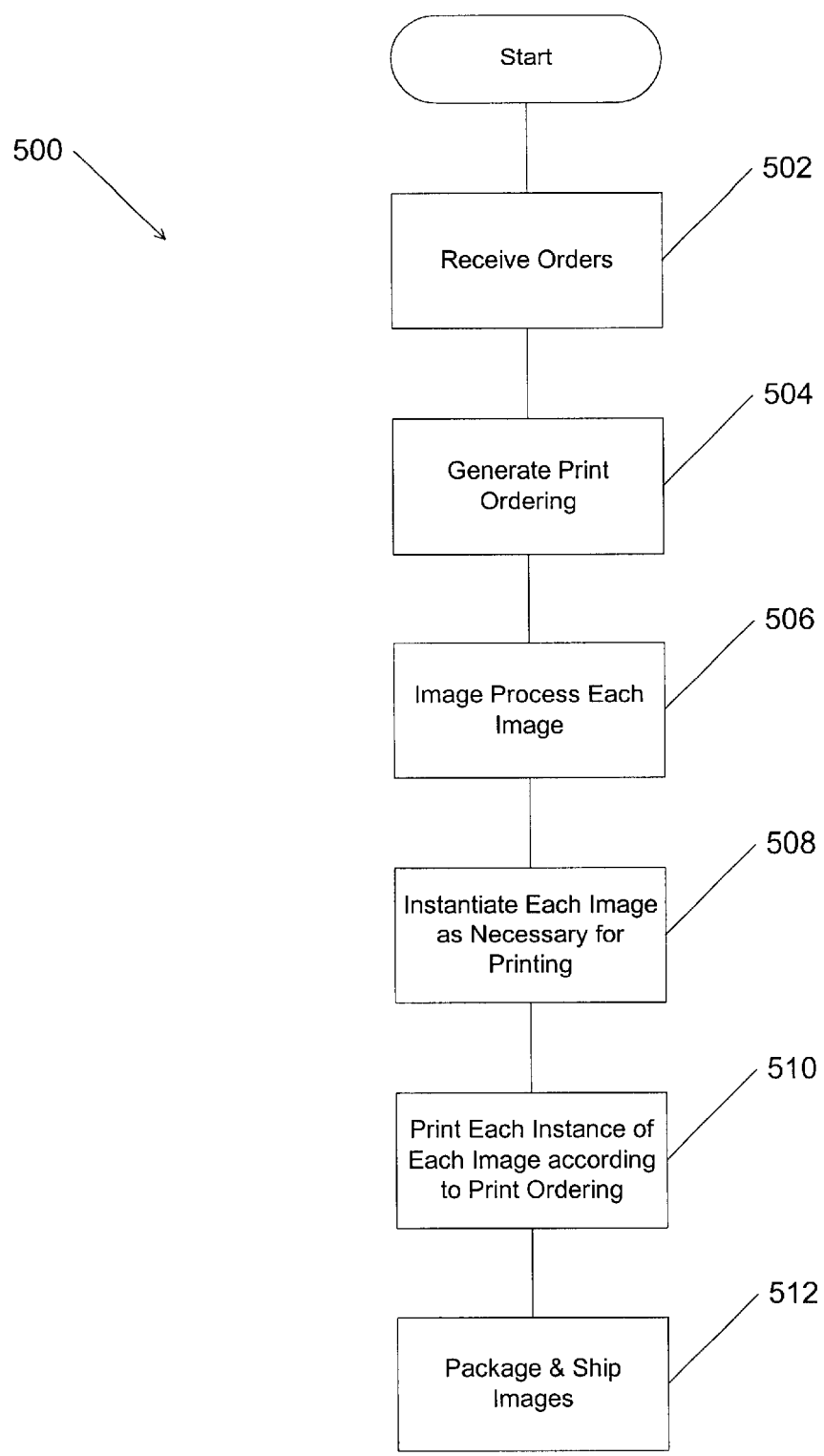
FIG. 6 is a flowchart of a process of fulfilling customer orders using a non-linear workflow model.

FIG. 6 is a flowchart of a process 500 of fulfilling customer orders using a non-linear workflow model. The orders are received in step 502. For example, orders that have been input by users (e.g., via the web front-end computer system 320) can be stored in a database (e.g., an orders database 602 shown in FIG. 9). When the photo-finisher (also referred to herein as a "print lab") is available to make prints, the photo-finisher can request that one or more user orders be transmitted to the photo-finisher (e.g., from the orders database 602), which then receives the transmitted orders.

In step 504, an ordering or sequence of the images for printing (referred to as a "print ordering") is generated. In other words, the images received from the user as a part of the order are rearranged (and later printed) in an order that is suitable and/or optimized for printing the images on a particular print line at a particular print lab. Thus, the images are not necessarily printed in the same order in which they were captured and/or supplied to the system by the user.

For example, the received orders can be separated (either physically or logically) into sub-orders, each of which corresponds to a set of prints (or other physical manifestation) to be generated and delivered to a separate destination address and/or intended recipient. The sub-orders can then be separated (either physically or logically) into printable units (also referred to as "sub-batches"). Each sub-batch corresponds to a set of prints that can be generated on the same printer (or other device for preparing a physical manifestation of a particular image) without having to manually reconfigure the printer (e.g., to produce prints of a different size) while the sub-batch is printing. Separating an order into sub-orders and sub-batches results in a print ordering in which each image for a given sub-batch is arranged (either physically or logically) together so that the images in a given sub-batch can be printed successively on the same printer without having to manually reconfigure the print while the sub-batch is printing. In other words, each image in a given printable unit (or sub-batch) has print parameters (e.g., size, finish, etc.) that are similar enough to the print parameters specified for the other images in the same printable unit so that the entire printable unit can be printed without having to manually reconfigure the printer while the printable unit is printing (referred to herein as "continuously printing" the printable unit). For example, one image from a given printable unit can specify that one copy of the image should be printed, while another copy from the same printable can specify that two copies of that image should be printed; however, because printers typically do not need to be manually reconfigured to print differing numbers of copies of an image, the fact that these two images specify that different number of copies of the respective images should be printed would not prevent these two images from being included in the same printable unit.

Moreover, batches (also referred to as "runs") can be assembled (either physically or logically) from the sub-batches. A batch can contain sub-batches from different orders, all of the sub-batches in a given batch being able to be printed on the same printer without having to manually reconfigure the printer while the batch is printing. The batches are assembled and a printer is designated for the batch based on, for example, the availability and capabilities (e.g., print size, finish, capacity, etc.) of the printers. Also, the assembly of batches and designation of printers for each batch can be done using a "global" scheduling algorithm in which a group of orders that are to be printed in a given period of time (e.g., in a particular work shift) are received and separated into sub-orders and sub-batches at the beginning of the shift; then, the batches are assembled and the printers are designated for each batch so that the batches are printed efficiently (or according to some criterion other than efficiency) using the available printers.

Alternatively, or in addition, an "immediate" scheduling algorithm can be used to assemble batches and select printers. In an immediate scheduling algorithm, orders are received at the print lab and separated into sub-orders and sub-batches periodically throughout a given shift. Batches are assembled and assigned to printers periodically during the shift based on the sub-batches and printers that are currently available when the batch is assembled. In any event, after a printer has been designated for a batch, the batch can be queued for printing (e.g., in a queue maintained by a line controller associated with the designated printer).

In step 506, each image in the order is image processed. Image processing may include correcting any errors or other undesirable artifacts resulting from the capture of the image or performing other image processing based on information related to the input device used to capture the image. Also, image processing may include calibrating and/or optimizing the image for printing on a particular printer or other output device that will be used to create a print and/or may include performing other image processing based on information related to the printer or other output device.

Image processing that does not depend on which type of printer or other output device will ultimately be used need only be performed once for each image in the order regardless of the number of times that the image ultimately will be printed. For example, if an image is to be printed for more than one recipient (e.g., if an image is included in more than one sub-order), such printer-independent processing activities need only be performed once for that image. Also, if a given image is to be printed multiple times on the same type of printer with the same print parameters, those image processing activities that are dependent on which type of printer and/or printer parameters ultimately will be used need only be performed once for that image and need not be performed for each of the multiple times that the image is to be printed on the same type of printer with the same print parameters.

Moreover, if the orders are separated into sub-orders and sub-batches as described above, then during image processing a destination identifier image can be created for each sub-batch based on information contained in the sub-batch. The destination identifier image is included in each sub-batch so that a destination identifier print will be printed when the images in that sub-batch are printed. Preferably, the destination identifier image is inserted into the sub-batch so that a destination identifier print will be printed before and/or after the other prints in the sub-batch are printed. By printing the destination identifier print before and/or after the other prints in the sub-batch, the destination identifier print can be used to delimit the various sub-batches within a batch.

Figure 7:
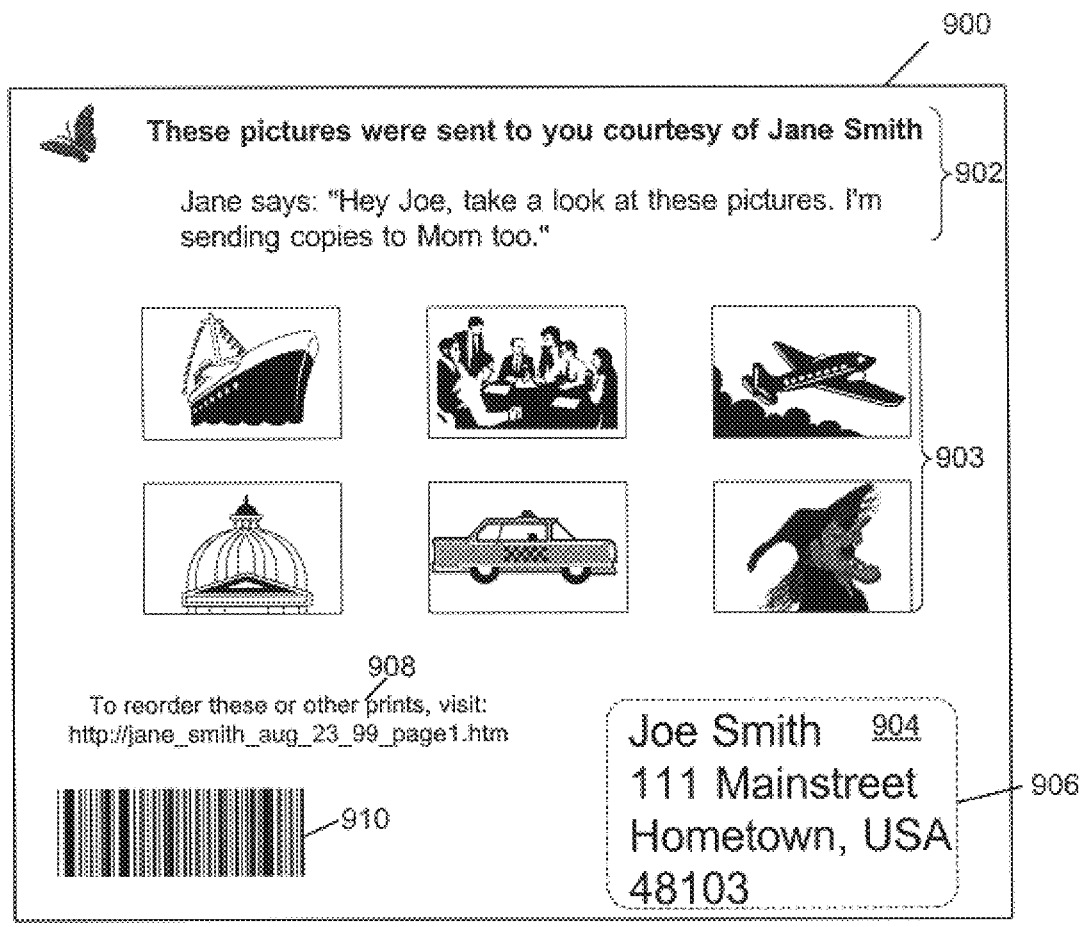
FIG. 7 is an example of a destination identifier print

An example of a destination identifier print 900 (which is printed from a destination identifier image that is created and inserted into a sub-batch) is shown in FIG. 7. A destination identifier image from which the destination identifier print 900 can be printed can include data for generating one or more of the following: a message 902 (e.g., a user-specified message or advertisement), thumbnail index 903 including thumbnail images 509, 511, 513, and 516–518 of the images included in the sub-batch, reordering information 908, bar code 910 (encoding, for example, shipping or billing information and/or manufacturing process information used to maintain quality control during print generation), and an address field 906 displaying the recipient's address. In one embodiment, the address field 906 is printed in a specified size and at a specified location so that it will be visible through a windowed envelope. Accordingly, the address field 906 not only serves as an identifier that can be used by the fulfillment enterprise for processing and handling this recipient's prints, but it also serves as the address label used by the shipper or courier for delivering the prints. In other embodiments, the destination identifier 900 can include virtually any other items of information that might prove useful to the recipient, the fulfillment enterprise, and/or the delivery service. Although the foregoing describes the destination identifier image as being created after the batches have been assembled, it is to be understood that the destination identifier images can be created any time prior to printing. For example, the destination identifier images can be created after the sub-orders are sub-divided into sub-batches.

In step 508, each image is instantiated (e.g., by creating a separate copy of data such as control and/or image data for that image) as needed for printing. For example, if desirable, a given image that is to be printed for multiple recipients can be instantiated at least once for each of the multiple recipients (e.g., for each sub-order and/or for each sub-batch). In addition, or alternatively, if the printer on which a given image is to be printed can operate in a more efficient manner (or if it is otherwise desirable to do so), an image that is to be printed multiple times on given printer can be instantiated once for each time that the image is to be printed.

Figure 8:
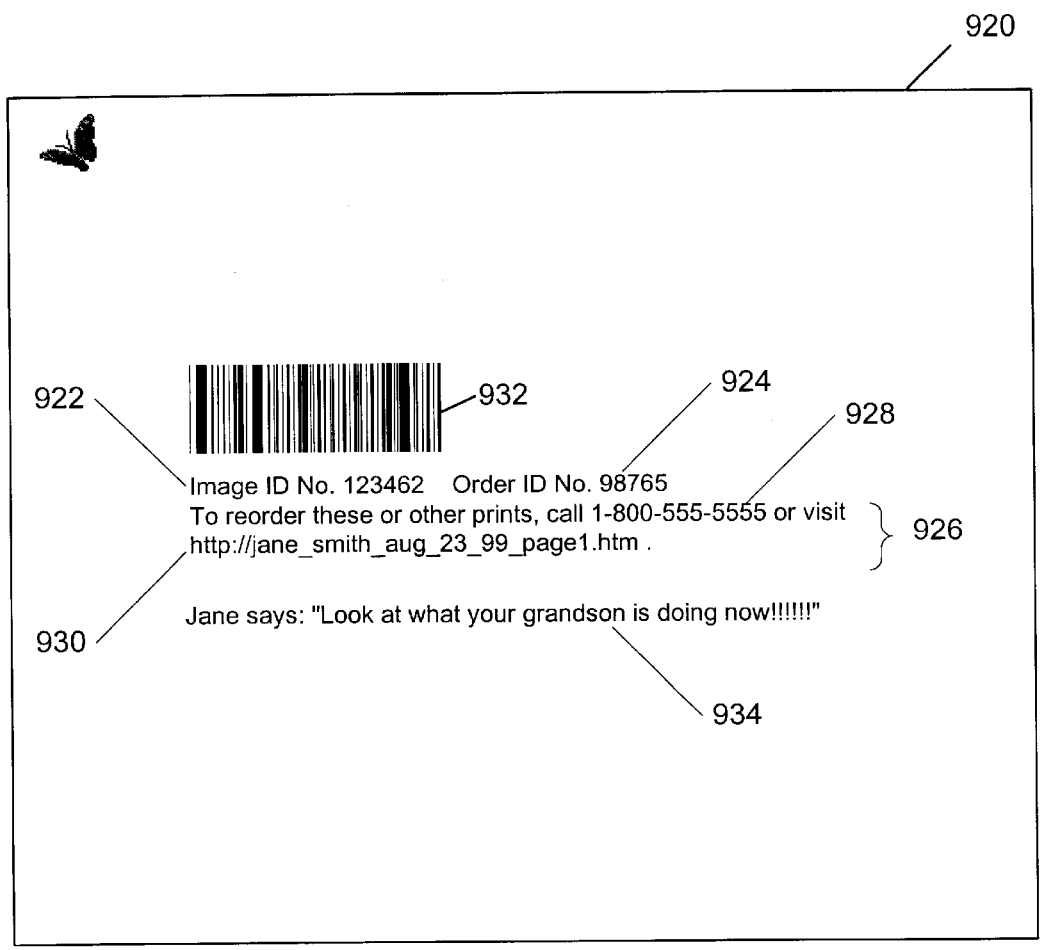
FIG. 8 is an example backprinted image print.

In step 510, each image is printed (or a physical manifestation of each image is otherwise created) in accordance with the print ordering. The printing operation includes printing or otherwise generating a physical representation of the image (e.g., printing the image on the front side of an image print). Printing can also include printing or otherwise including non-image information (e.g., bar codes, identification numbers, messages, advertisements, reorder information, etc.) on one or more of the prints or other physical manifestations of the image. The non-image information can be used for controlling and monitoring the printing, packaging, and/or shipping of the image and/or can be used to impart predetermined information to the recipient of the image. For example, as shown in FIG. 8, non-image information may be printed on the back (i.e., non-image side) of an image print 920 and may include a unique identification number 922 for the image from which the print was made (i.e., an "image ID" number), a unique order identification number 924 (which may encode recipient information), reorder information 926 such as a phone number 928 and/or a URL 930 for a website from which prints can be reordered, a bar code 932 (encoding, for example, an audio message or processing data), and/or a user specified message 934. Also, a different user specified message 934 can be printed for different recipients (e.g., one message can be printed for the person who took the image and other messages can be specified for the other recipients). In addition, the non-image information may include the name of the photographer who took the image, the date the image was taken, the date the image was printed, a copyright notice, and language describing any legal restrictions on using the image.

In one potential implementation, audio samples from a user who is uploading images could be captured, digitized and encoded on the back of one or more image prints. For example, an audio encoder utility on the user's computer could record a voice message from the user (e.g., "Look at what your grandson is doing now"), associate the captured message with one or more images specified by the user, and then encode the message (e.g., in bar code form) and print it on the back of the corresponding image print. The print recipient could play back the message, and actually hear the image originator's voice, by using a bar code reader and voice message decoding software. Such a device could be sent to the print recipient along with the print order.

In step 512, the prints or other physical manifestations of the images are then packaged and shipped to their intended recipients. For example, if the orders are separated into sub-orders and sub-batches from which batches are assembled, each sub-batch of prints is packaged and shipped to the recipients associated with that sub-batch. Multiple sub-batches from a given sub-order, which by definition have the same recipient, can be packaged and shipped together (e.g., to save on packing and shipping costs) and/or a sub-order's sub-batches can be packaged and shipped individually to the sub-batches' respective recipients (e.g., to simplify the packaging and shipping process).

One embodiment of a system 600 in which the process 500 can be implemented is shown in FIG. 9. In the print lab system 600 shown in FIG. 9, each order includes control data and image data. The control data contains information such as print parameters (including print size, number of copies and print finish), user contact information, recipient information (including the shipping address of each recipient and the image IDs of each image associated with that recipient), payment information, and any special messages that are to be printed or encoded on any of the image prints included in the order. The image data includes the pixel data used to generate the image (e.g., JPEG data). In the embodiment shown in FIG. 9, the control data and the image data for each order are stored separately after originally being received from the user. The control data for each order is stored in an orders database 602, while the image data for each order is stored in an image archive database 604. It is to be understood, however, that at least some, if not all, of the control data can be stored with the image data (e.g., in the image archive database 604 or elsewhere) in either the orders database 602, the image archive database 604, or elsewhere, if the system designer found it desirable to do so.

The system 600 includes one or more print labs 606 (only one of which is shown in FIG. 9). Each print lab is connected to the orders database 602 and the image archive database 604. One or more print labs 606 can be physically located with or near the orders database 602 and the image archive database 604 so that the orders database 602 and the image archive database 604 can be connected over a relatively high-speed connection such as a local area network. In addition, or alternatively, one or more of the print labs 606 can be physically located apart from the orders database 602 and the image archive database 604 and/or apart from the other print labs 606. In such a case, the print labs 606 can be connected to the orders database 602 and the image archive database 604 via a wide area computer network such as the Internet.

Each print lab 606 includes a scheduler 608, an image cache 610 and one or more print lines 612 (only one print line 612 is shown in FIG. 9). The scheduler 608 is connected to the orders database 606 (e.g., over the Internet) and is connected to the image cache 610 and to one or more line controllers 614 that are included in each of the print lines 612. Each print line 612 also includes a queue 616 for storing batches or other printable units while they are waiting to be printed and line equipment 618 for image processing, printing, packaging and shipping images and the resulting image prints. The scheduler 608 is connected to the image cache 610 and the line controllers 614, and the line controller 614 is connected to the queue 616 and the line equipment 618 using relatively high-speed, local connections (e.g., over a local area network).

The scheduler 608 request orders from the orders database 602. In response, the orders database 602 sends orders to the scheduler 608 that can be printed on one or more of the print lines 612 included in the print lab 606, if any such orders are available when the request is received by the orders database 602. The scheduler 608 can employ, for example, a global scheduling algorithm in which a group of orders to be printed during a given period (e.g., a work shift) are scheduled at the beginning of the shift according to some scheduling criterion (e.g., to print the jobs in an efficient manner). When using such a global scheduling approach, the scheduler 608 polls each of the line controllers 614 in the print lab 606 to identify the capabilities and availability of each print line 612 in the print lab 606. For example, the line controllers 614 can provide the scheduler 608 with such information as what types of prints the respective print lines 612 can produce (e.g., by specifying print sizes, finishes, etc.) in their current configurations, how many prints the respective print lines 612 can print during the shift (e.g., by specifying how much paper each print line 612 has and the rate at which the print line 612 can produce prints), and how many batches the respective print lines 612 currently have queued for printing. The scheduler 608 uses such information from the line controllers 614 to determine the print lab's capacity and capabilities during the shift. Such information is conveyed to the orders database 602, which in response sends orders to the scheduler 608 for printing during that shift.

After receiving the orders from the orders database 602, the scheduler 608 separates the orders into sub-orders and sub-batches. Then, the scheduler 608 assembles batches from the available sub-batches, assigns each batch to a print line 612 that has the capability, and is configured to, print the images in that batch, and arranges the batches for queuing based on the information supplied by the line controller 614. For example, the scheduler 608 can assemble, assign, and queue the batches in order to enhance the efficiency with which the available print lines 612 are used. Then, each of the batches are queued with the designated print line 612 in the selected order for printing during the shift.

Alternatively, or in addition, the scheduler 608 can schedule print jobs using an immediate or "just-in-time" scheduling approach in which orders are requested from the orders database 602 and scheduled for printing as space becomes available on the print lines 612. When operating in such a just-in-time mode, each line controller 614 sends capability and availability information for that line controller's print line 612 to the scheduler 608 when the line controller 614 determines that the print line 612 has space available in its queue 616. The scheduler 608 checks if it can assemble an appropriate batch from any sub-batches currently stored in scheduler's pool of sub-batches. If it can, an appropriate batch is assembled from the sub-batches currently stored in the scheduler's pool and sent to the line controller 614, which stores the batch in its queue 616. If the scheduler 608 is unable to assemble an appropriate batch that can be printed on the available print line 612, the scheduler 608 sends a message to the orders database 602 conveying the current capabilities and availability of all the print lines 612 in that scheduler's print lab 606. The orders database 602 then sends orders that can be printed on the print lines 612 (preferably orders having at least one or more sub-batches that can be printed immediately on an available print line 612) to the scheduler 608. After receiving any orders from the orders database 602, the scheduler 608 separates the orders into sub-orders and sub-batches and stores the sub-batches in the scheduler's pool. Then, the scheduler 608 assembles batches that can be printed on the available print lines 612 from the pooled sub-batches and assigns each batch to a print line 612 that is available and capable of printing the images in that batch. Then, the batch is sent to the assigned print line 612 and stored in that print line's queue 616. Any sub-batches that cannot be immediately printed on an available printer line 612 remain in the pool until they can be printed at a later time when a print line 612 capable of printing the sub-batches becomes available.

The image cache 610 is connected to the scheduler 608 and includes internal storage (e.g., a hard disk) for storing the image data of images that are queued in the print lines 612. When the scheduler 608 receives an order from the orders database 602, the scheduler 608 sends a message to the image cache 610 requesting that the image cache 610 cache the image data for the images included in that order. The image cache 610 checks its internal storage for the image data for the requested images. If the image data is not in its internal storage, the image cache 610 sends a message to the image archive database 604 requesting the image data for those images. In response, the image archive 604 sends the image data for the requested images to the image cache 610, which stores the image data in its internal storage. When the image cache 610 has stored the image data for an image requested by the scheduler 608, the image cache 610 sends a message to the scheduler 608 indicating that the image data for the requested image is stored in the image cache 610.

Figure 10:
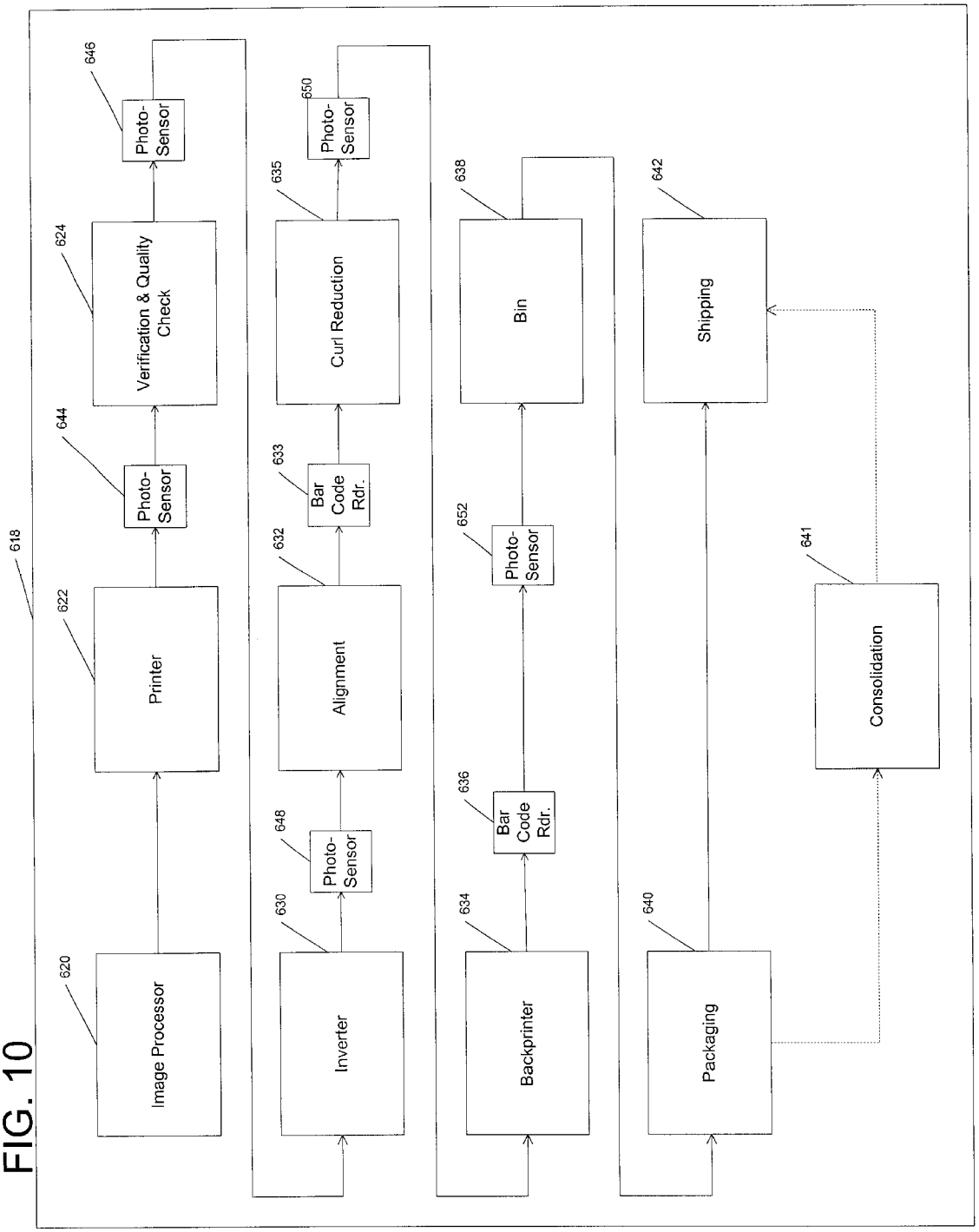
FIG. 10 is block diagram of lab equipment and personnel that can be used in the print lab system of FIG. 9.

Then, after the scheduler 608 queues a batch of images with a print line 612, the scheduler 608 sends a message to the image cache 610 requesting that the image cache 610 send the image data for the images in the queued batch to the print line 612. The image cache 610 sends the image data to the line equipment 618 (specifically, to an image processor 620 shown in FIG. 10), which stores the image data in internal storage (e.g., on a hard disk drive) contained within the image processor 620. The image processor 620 is connected to the image cache 610 and the components of the line equipment 618 shown in FIG. 10 are connected to the line controller 614 although these connections are not illustrated in FIG. 10. The image data sent to the image processor 620 can be image processed immediately (i.e., before the batch with which the images are associated reaches the front of the queue 616) and/or the image data can be image processed just prior to sending the image data to a printer 622 (shown in FIG. 10) for printing. For example, the line controller 614 can send the image processor 620 a message that includes the batch's control data and that requests that the images in the batch be image processed and sent to the printer 622. Upon receiving such a message, the image processor 620 image processes the images in the batch (using the batch's control data) and then sends the images to the printer 622. After sending each image to the printer 622, the image processor 620 sends a message to the line controller 614 indicating that the image has been image processed and sent to the printer 622. Alternatively, or in addition, the image processor 620 can send a message to the line controller 614 indicating that all the images in the batch have been image processed and sent to the printer 622.

Alternatively, or in addition, the print lab 606 can be configured to operate without using an image cache 610. For example, the image processor 620 can be connected to the image archive database 604 and the scheduler 608, the line controller 614, and/or the image processor 620 can be configured to send a message to the image archive database 604 requesting image data for the images that are to be printed. In response, the image archive database 604 would send the image data for the requested images to the image processor 620.

Figure 11:
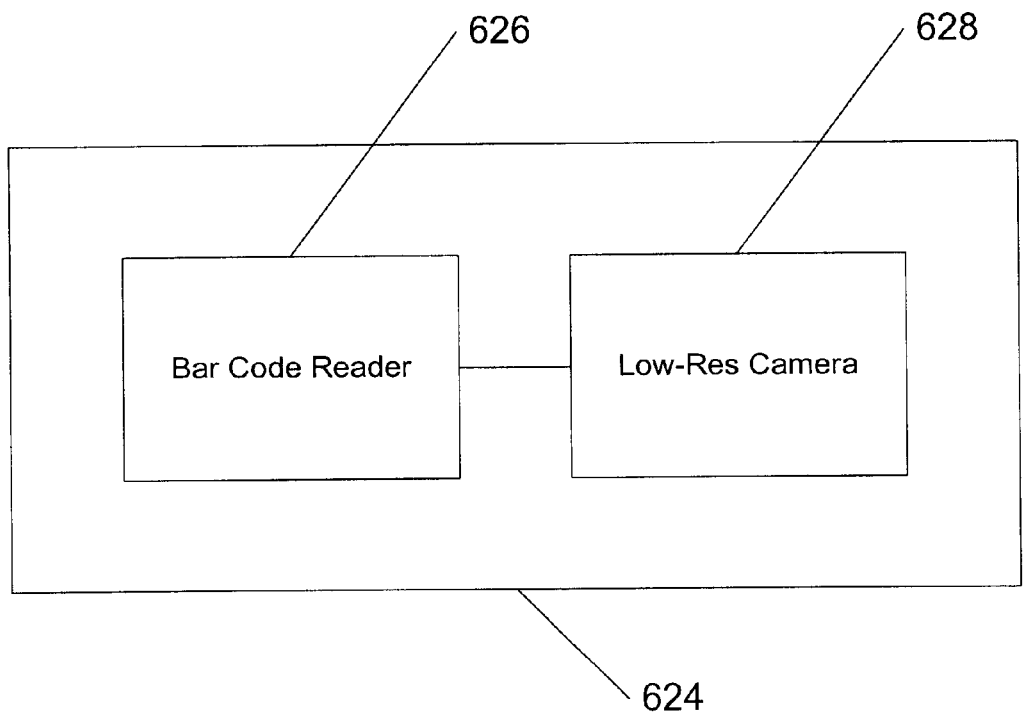
FIG. 11 is a block diagram of a print verification and quality control equipment that can be used in the print lab system of FIG. 9.
Figure 12:
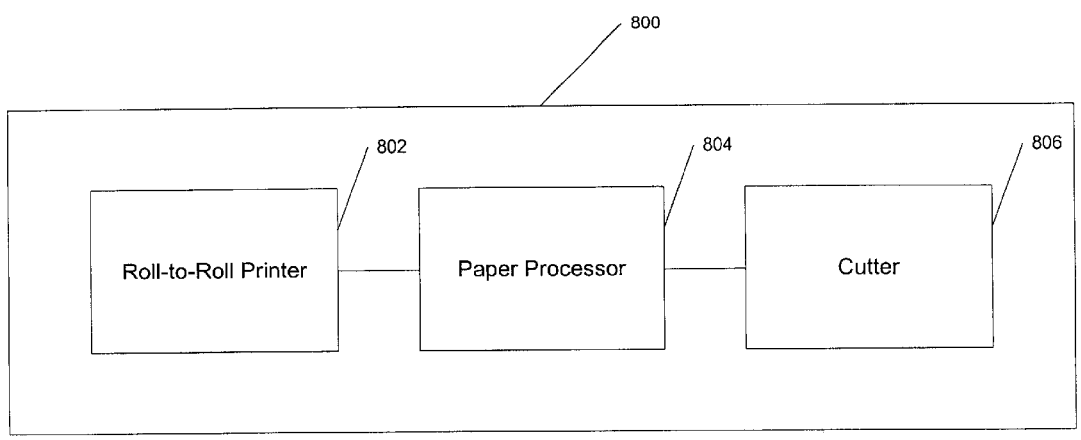
FIG. 12 is a block diagram of a roll-to-roll type printer system that can be used in the print lab system of FIG. 9.

The printer 622 prints the images, and the image prints are conveyed to the other line equipment 618 using any suitable conveyor mechanism (e.g., conveyor belts and rollers). A suitable printer 622 for use in the embodiment shown in FIGS. 10–11 is a "digital minilab" that performs all the exposing, developing, and cutting operations necessary to print and cut image prints. One such suitable digital minilab printer is a Konica Digital Minilab Model No. QD-21 printer, commercially available from Konica Corporation. of Tokyo, Japan. It is to be understood, however, that the system 600 can be modified to work with other type of printers. For example, as shown in FIG. 12, the system 600 can be modified to work with a roll-to-roll type printer system 800 that includes a roll-to-roll printer 802 that exposes successive images onto successive portions of a roll of print paper. The roll of exposed paper is fed into a paper processor 804 that develops the exposed portions of the roll of print paper. The exposed and processed portions of the roll of print paper are then cut by a cutter 806 (e.g., a multi-cutter) into separate image prints having the desired dimensions. In addition, the roll-to-roll type printer system 800 can include a backprinter (not shown in FIG. 12), for example, as an integral part of the roll-to-roll printer 802 or as a separate piece of equipment (e.g., positioned between the paper processor 804 and the cutter 806).

Referring again to FIG. 10, the line equipment 618 also includes print verification and quality control equipment 624 for checking that the proper sub-batch and images are being printed in the proper order and that the images have the desired print quality. One example of a print verification and quality control equipment 624 that can be used with the system 600 is shown schematically in FIG. 11. (Each component shown in FIG. 11 is connected to the line controller 614 in a conventional manner although no such connections are shown.) A barcode reader 626 is connected to the line controller 614 and receives prints that have been printed by the printer 622. The bar code reader 626 reads a bar code printed on each destination identifier print that encodes a sub-batch identification number. For example, the sub-batch identification number can be a temporarily unique number. In other words, the sub-batch identification number can be a number that is unique over a given range of sub-batches, for example, a number produced by a six-digit counter that rolls over to 000000 after 999999 sub-batches have been processed. Use of a temporarily unique sub-batch identification numbers avoids the processing overhead that can be associated with the use of a permanently unique identification numbers (e.g., a shorter sub-batch identification number can be used). Preferably, the scheduler 608 generates the temporarily unique sub-batch number and includes it in the control data that is sent with each sub-batch to the line controller 614. If a print other than a destination identifier print is received by the bar code reader 626, the bar code reader 626 will not be able to read a bar code. Whether or not the bar code reader 626 is able to read a bar code and any sub-batch number read by the bar code reader 626 can be used to determine whether the proper sub-batch is being printed on the correct print line 612, whether the sub-batches are being printed in the correct order, and whether the images prints and the destination identifier prints are being printed in the correct order. This determination can be made by the line controller 614 (e.g., by having the bar code reader 626 send the bar code information back to the line controller 614) or can be made by the bar code reader 626 and/or a micro controller connected to the bar code reader 626. If an error is detected, error recovery processing can be initiated. For example, the print line 612 can be shut down and an operator alerted, or the errant sub-batch can be reprinted.

The print verification and quality control equipment 624 shown in FIG. 11 also includes a low-resolution camera 628 that captures low-resolution image data of the printed image. The low-resolution image data captured from the image print can be used to determine if the image prints are being printed in the correct order and if the image prints have the desired print quality. For example, the image data from which an image print was printed can be downsampled or otherwise decimated to produce low resolution image data (i.e., the "expected" low-resolution data) that should correlate to the low resolution data captured by the low resolution camera 628 (i.e., the "actual low-resolution image data) after correcting (or otherwise accounting) for the type of printer that was used, and any shifting, skewing, and/or magnification or reduction of the image print during capture of the actual low resolution image data. Whether or not the actual low resolution image data correlates with the expected low-resolution image data can be determined in any number of conventional ways. For example, respective signatures for the actual low-resolution image data and the expected low-resolution data can be calculated (e.g., using the Haar and Daubechies D4 and D6 feature-recognition algorithms described in the book "Discovering Wavelets," by Aboufadel and Schickler, published by Wiley-Interscience, which is hereby incorporated by reference) and compared. If the signatures match within a specified tolerance, the actual low-resolution image data is considered to be correlated with the expected low-resolution image data and the image print is considered to have been printed in the proper order.

In addition to verifying that the print images are being printed in the correct order (i.e., the "verification" check), the actual and expected low-resolution image data can be used to check the quality of the images being printed (i.e., the "quality" check). For example, after correcting or other accounting for the type of printer being used and any skewing, shifting, or scaling of the actual low-resolution image data, a pixel-by-pixel comparison of corresponding pixels in the actual and expected low-resolution image data can be performed. If a predetermined percentage of the pixels match (within a predetermined tolerance), than the image print is considered to have the desired image quality; if a predetermined percentage of the pixels do not match, then the image print is not considered to have the desired image quality and a error signal can be produced and sent to the line controller 614 and other line equipment 618 for initiating error recovery processing.

The downsampling of the original image data and/or the verification and quality comparisons can be performed by a processor associated with the low resolution camera 628 and/or can be performed by the line controller 614. Also, it is to be understood that other image tests and comparisons can be performed on the actual and/or expected low-resolution data. Moreover, the verification and/or quality checks can occur later in the print generation process (e.g., the bar code reader 626 can be positioned downstream from an inverter 630).

Referring again to FIG. 10, after the quality and verification checks have been performed by the print verification and quality control equipment 624, the image prints are inverted (i.e., are flipped over so that the non-image side of the image print is exposed) using an inverter 630. FIGS. 13A–B show a chute inverter 700 that can be used in the system 600. The chute inverter 700 has a C-shaped passageway 702 through which image prints travel and are flipped. As shown in FIG. 13B, an image print 704 is printed by the printer 622 and is conveyed to the chute inverter 700 on a belt conveyor 701 with the image side of the image print 704 facing away from the belt conveyor 701. When the image print reaches the end of the belt conveyor 701, the image print 704 is rotated (e.g., by an arm 709 extending partially into the path of the image print 704) and falls off the end of the belt conveyor 701 into a slide 703. The image print 704 slides down the slide 703 and enters the C-shaped passageway 702. A guide housing 705 is positioned near the opening of the C-shaped passageway 702 to help guide the image print 704 into the C-shaped passageway 702. The image print 704 travels along the C-shaped passageway 702 so that the image print 704 exits the C-shaped passageway 702 with its non-image side facing away from a belt conveyor 711, which receives, orients, and conveys the image print 704 to a skew conveyor 710 (described below in connection with FIG. 14).

FIGS. 22–23 shows an alternative embodiment of an inverter 1000 that can be used in place of the chute inverter 700 and the slide 703 to receive an image print 704 from the belt conveyor 701, invert the image print 704, and deliver the image print 704 to the belt conveyor 711. The inverter 1000 has a Y-shaped design that includes a back slide 1002 that is positioned at an oblique angle with respect to the belt conveyor 711. The inverter 1000 also includes a front slide 1004 that is separated from the back slide 1002 by a passage 1006 through which an image print 704 can pass. The front slide 1004 is held in place by a pair of brackets 1008 (which are connected to side walls 1010) at an acute angle with respect to the belt conveyor 711. When an image print 704 reaches the end of the belt conveyor 701 (not shown in FIGS. 22–23), the image print 704 is rotated (e.g., by the arm 709 shown in FIG. 13B) and falls off the end of the belt conveyor 701 and onto front slide 1004 of the inverter 1000. The image print 704 slides though the passage 1006 and into the back slide 1002. The image print 704 slides down the back slide 1002 until the bottom edge of the image print 704 contacts the belt conveyor 711. The belt conveyor 711 pulls the bottom edge of the image print 704 in the direction that the belt conveyor 711 moves, which causes the image print 704 to lay on the belt conveyor face down. As with the inverter 700, it is preferable that the outer surfaces of the back slide 1002 and the front slide 1004 on which image prints slide are constructed from and/or covered with a material (e.g., paper or stainless steel) that reduces or inhibits the build up of a static charge that would cause the image print 704 to stick to the back slide 1002 or the front slide 1004.

Again referring to FIG. 10, after the image prints have been inverted by the inverter 630, the image prints are aligned by alignment equipment 632. As shown in FIG. 14, a skew conveyor 710 can be used to align the image prints 704 after they have been inverted. The skew conveyor 710 includes an alignment wall 712 against which the image prints 704 are aligned. The image prints 704 are moved into alignment with the alignment wall 712 by multiple alignment rollers 714 that have their axes arranged at an oblique angle with respect to the alignment wall 712. The angled orientation of the alignment rollers 714 causes the image prints 704 to move towards, and come into alignment with, the alignment wall 712. The oblique angle is set so that an image print 704 can come into alignment with the alignment wall 712 before the image print 704 leaves the multiple alignment rollers 714 and passes onto the first of multiple perpendicular rollers 716. An alignment sensor 718 is positioned beyond the perpendicular rollers 716 of the skew conveyor 710 (e.g., above a vacuum table 719 that is used as a part of the curl reduction equipment 635 described below). The alignment sensor 718 can be any sensor (e.g., an optical sensor) that detects the presence of an image print 704 under the sensor 718. As shown in FIG. 14, the alignment sensor 718 is positioned near the alignment wall 712 (which can extend beyond the end of the skew conveyor 710 and over at least a portion of the vacuum table 719) so that the sensor 718 can detect when image prints 704 pass underneath it.

FIG. 15A shows an image print 704 that is properly aligned with the alignment wall 712 as the image print 704 passes the sensor 718. An example of a signal that is produced by the sensor 718 as the properly aligned image print 704 passes the sensor 718 is shown in FIG. 15B. The sensor 718 produces a generally bi-level signal 720 in which the signal is at first signal level 722 (e.g., a low signal level) when the sensor 718 does not sense an image print 704 directly underneath the sensor 718 and is at second signal level 724 (e.g., a high signal level) when the sensor 718 senses that an image print 704 is directly beneath the sensor 718. Therefore, when an image print 704 first passes underneath the sensor 718, the signal 720 transitions from a low signal level to high signal level and when the image print 704 has moved along the conveyor 710 so that no part of the image print 704 is beneath the sensor 718, the signal 720 transitions from a high level to a low signal level.

FIG. 15C depicts an image print 704 that is misaligned with the alignment wall 712 as the image print 704 passes the sensor 718. An example of a signal that is produced by the sensor 718 as the misaligned image print 704 passes the sensor 718 is shown in FIG. 15D. As shown in FIGS. 15C–D, when the image print 704 is misaligned with the alignment wall 712, the resulting pulse 726 will not be as long as the pulse that otherwise would be produced if the image print was properly aligned with the alignment wall 712 (which is shown in FIG. 15B). Therefore, if the generated pulse width for a given image print 704 is not as long as the pulse width of a properly aligned image print 704, the image print 704 is considered to be misaligned with the alignment wall 712. The line controller 614 and/or a microcontroller associated with the alignment sensor 718 can store how long the pulse width (the "target" pulse width) of a properly aligned image print (for a given image print size) should be and compare the measured pulse width to the target pulse width and send an error message to line controller 614 and/or the other line equipment 618 if the measured pulse width is not (within a specified tolerance) as long as the target pulse width. The difference between the width of a pulse generated for a misaligned image print and the width of a pulse generated for a properly aligned image print is greater (i.e., such an alignment sensing approach is more sensitive to misalignment) the closer the alignment sensor 718 is positioned to the alignment wall 712. Therefore, the sensitivity of such an approach can be increased by moving the sensor 718 closer to the alignment wall and decreased by moving the sensor 718 away from the alignment wall 712.

Another inverter that can be used in the print lab 606 is shown in FIGS. 24–26. Inverter 950 includes a J-shaped arm having first and second walls 954 and 956. First and second walls 954 and 956 are arranged parallel to one another with a gap 958 (shown in FIG. 25) formed therebetween in which an image print can be received. Both the first and second walls 954 and 956 are joined at their respective proximal ends to opposing sides 962 and 964 of a bottom wall 960. A guide 970 (shown in FIGS. 24–25) is positioned at the bottom of the gap 958 adjacent the base wall 960 and has a groove 972 formed therein to receive the end of an image print inserted into the inverter 950. Thus, an image print that is received by the inverter 950 will be aligned by the guide 970. The guide 970 can also include one or more sensors 974 for sensing when the edge of an image print has been received and aligned by the guide 970. Preferably, the bottom wall 960 is curved so as to match the image print's natural curvature (which tends to develop as the print dries) and to enhance the rigidity of the image print (e.g., as shown in FIG. 24 side 962 of the bottom wall 960 can include a convex curvature and side 964 of the bottom wall 960 can include a concave curvature). Also, the first and second walls 954 and 956 preferably are formed so that their respective distal ends bow out in the longitudinal direction and are substantially non-curved (i.e., the respective distal edges of the first and second opposing side walls are substantially straight) in the transverse direction.

As shown in FIG. 26, an image print 704 is conveyed to the inverter 950 by a conveyor 976 (e.g., a belt conveyor on which image prints are placed immediately after printing) with the image print 704 face-up (i.e., with the image side of the image print 704 facing away from the belt conveyor 976). The inverter 950 is initially in position 978 with the distal end of the J-shaped arm near the end of the conveyor 976. As the image print 704 is conveyed off of the conveyor 976, the image print 704 enters the inverter 950 and is aligned by the guide 970. Once the sensors 974 sense that the image print 704 has been fully received and aligned, a rotation arm 980 (powered, e.g., by a conventional servomotor, not shown, that is controlled using pulse-width modulation) rotates the inverter 950 to the position 982 (represented by dashed lines in FIG. 26). The inverter 950 includes a rubber grip 984 (shown in FIGS. 24–25) located on the inside surface of the first wall 954 that grips the image print 704 during rotation of the inverter 950 and that helps to prevent the image print 704 from backsliding when the image print 704 is being inserted into the inverter 950. After rotating to position 982, the distal portion of the image print 704 comes into contact with a vacuum table 986, which pulls the image print 704 out of the inverter 950 and onto the vacuum table 986 with the image print 704 face down (i.e., with the image side of the image print 704 facing towards the vacuum table 986). Preferably the first wall 954 is longer than the second wall 956 so that the portion of the first wall 954 that extends past the second wall 956 can hold the image print 704 down while it is being removed from the inverter 950. By using the inverter 950, the image print 704 is both inverted and aligned for subsequent backprinting. Therefore, if the inverter 950 is used, separate alignment equipment need not be used.

Referring again to FIG. 10, after the image prints have been aligned by the alignment equipment 632, the bar code printed on the face side (which faces down) of destination identifier prints is then read by a bar code reader 633. For example, one of the perpendicular rollers 716 of the skew conveyor 710 (shown in FIG. 14) can be removed so that the bar code reader 633 can be placed underneath the skew conveyor 710. By placing the bar code reader 633 underneath the gap left by the removed perpendicular roller 716, the bar code reader 633 can read the bar codes printed on the destination identifier prints through the gap as the destination identifier prints move off of the skew conveyor 710.

After the prints pass by the bar code reader 633, any curling in the image prints is reduced using curl-reduction equipment 635 (shown in FIG. 10). The curl-reduction equipment 635 inhibits the natural curling of the image prints due to drying so that the image prints are flat during backprinting (described below). Preferably, the curl-reduction equipment 635 includes a vacuum table that flattens the image prints using suction as the image prints are conveyed to a backprinter 634 and during backprinting. During backprinting, the backprinter 634 prints non-image information onto the exposed back sides of the image prints. The backprinter 634 can be any type of printer (e.g., contact, laser, or inkjet printer); a suitable printer that can be used as the backprinter 634 is the 4S Plus model inkjet printer, which is commercially available from Imaje S.A., of Valence, France.

After backprinting, a bar code reader 636 reads any bar codes that have been printed as a part of the non-image information on the back side of the image prints in order to determine if the proper non-image information has been printed on the proper image prints. (The assumption being that if the bar code information was printed correctly, then the rest of the non-image information was printed correctly). This determination can be made by the line controller 614 (e.g., by having the bar code reader 636 send the bar code information back to the line controller 614) or can be made by the bar code reader 636 and/or a local controller processor connected to the bar code reader 636. Alternatively, or in addition, a quality check as described above can be performed using a low-resolution camera to check that all the non-image information was printed correctly.

After the image prints have been backprinted and the bar code reader 636 has read any bar code information printed on the back side of the image prints, the image prints are conveyed to binning equipment 638. As shown in FIG. 16, the image prints 730 are conveyed on a belt conveyor 732 to a bin 734. When the image prints 730 reach the end of the belt conveyor 732, the image prints fall into the bin 734 with their image sides (i.e., front sides) facing down. As shown in FIGS. 16–17, the bin 734 has a V-shaped bottom formed from first and second bottom walls 736 and 738. The first and second walls are joined at a corner 740 and form a right angle. The first bottom wall 736 is inclined in both the pitch direction (i.e., it slopes from an upper transverse edge 737 to a lower transverse edge 739) and in the roll direction (i.e., it slopes from an upper side edge 741 to a lower side edge 743). A side wall 742 is joined to the first and second bottom walls 736 and 738 along the lower side edge 743. The pitch incline of the first bottom wall 736 tends to cause the image prints to slide towards the lower transverse edge 739 and abut the second bottom wall 738 while the roll incline tends to cause the image prints to slide towards the lower side edge 743 and abut the side wall 742. In this way, the pitch and roll inclines of the first bottom wall 736 cause the image prints to be stacked in the bin 734 with their bottom edges (i.e., the edges abutting the second bottom wall 738) and lower side edges (i.e., the edges abutting the side wall 742) properly aligned and registered so as to form a neat stack within the bin 734 that can be removed and packaged without additional shuffling to align the image prints. Preferably the bin 734 does not include a side wall opposite the side wall 742 and the first bottom wall 736 has a corner notch 746 formed therein so that an operator can easily access and grab the image prints stacked within the bin 734.

As shown in FIG. 16, successive bins 734 can be positioned beneath the end of the belt conveyor 732 by a bin conveyor 750. The bin 734 shown in FIGS. 16–17 has a base 748 for placing the bin 734 on the bin conveyor 750. Each time all the image prints for a sub-batch have been binned, the bin conveyor 750 is indexed (i.e., moved so that a new bin 734 is positioned beneath the end of the belt conveyor 732).

Referring again to FIG. 10, after the image prints have been binned, the image prints are packaged (box 640) and shipped (box 642). Packaging involves removing the image prints from the bin 734 (e.g., by having an operator grab the stack of image prints) and placing the image prints in appropriate packaging (e.g., an envelope having the correct size and postal/courier markings). The appropriate type of packaging can be identified for the operator removing the image prints from the bin 734 by having the operator use a bar code reader 758 (shown in FIG. 18) to read the bar code encoding the sub-batch number that is printed on the destination identifier print to identify what type of packing material should be used and what type of shipping method should be used. For example, the sub-batch number can include one or more digits ("shipping digits") that indicate what type of packaging material and what type of shipping method should be used. The bar code reader 758 is connected (either directly or via a microcontroller and/or the line controller 614) to lights 760 (or other visual indicators) that are positioned above bins 762 of packaging material. The bar code reader 758 reads the shipping digits and illuminates one of the lights above the bin containing the packaging material that should be used for that particular sub-batch. The operator would then remove the packaging material from the bin associated with the illuminated light 760 and package the stack of image prints in that packaging material. Alternatively, or in addition, a display monitor could be used to display information indicating from which bin 762 the packaging material for the current sub-batch should be removed. The information displayed on the display monitor can be based on the information read by the bar code reader 758.

Also, the sub-batch number read by the bar code reader 758 can be used to presort the packaged sub-batches for shipping. Sorting bins 764 can be used to sort the package sub-batches, for example, according to weight and/or ZIP code in order to reduce shipping costs. For each of the shipping methods that are used, a separate sorting bin 764 can be included for each weight class or ZIP code. The shipping digits for the sub-batch can indicate the shipping method to be used for the sub-batch, the weight (or the appropriate weight class) of the sub-batch (which, e.g., can be calculated by the scheduler 608) and/or the ZIP code to which the sub-batch is to be shipped. Then, when the sub-batch number is scanned, a light 760 above the sorting bin 764 that is associated with that sub-batch's shipping method and weight class or ZIP code is lit. An illuminated light 760 indicates to the operator that the packaged sub-batch should be inserted into the sorting bin 764 associated with the illuminated light 760.

Instead of, or in addition to, including shipping digits in the sub-batch bar code number printed on the destination identifier print, the bar code reader 758 (or bar code microcontroller or the line controller 614) can store the control data for each sub-batch that is printed on the print line 612. After reading the sub-batch number from the destination identifier print, the appropriate packaging material, shipping method, and sorting information can be determined from the stored control data. Moreover, instead of using a separate bar code reader 758, the bar code reader 636 could be used to determine which packaging material and shipping method should used so that the operator would not have to read the bar code.

Also, the line equipment 618 can include equipment (box 641) for consolidating one or more sub-batches from the same sub-order so that the sub-batches can be packaged and shipped together. For example, two print lines 612 (e.g., one line printing 4"×6" prints and the other line printing 5"×7" prints) can be located in the print lab 606 so that a single operator can package and ship the image prints from both print lines 612. The scheduler 608 and the line controllers 614 for each of the print lines 612 can be programmed to recognize when sub-batches from the same sub-order are being printed on the two adjacent print lines 612 and flag the sub-batches printed on both print lines 612 as being in the same sub-order. For example, a storage rack 767 (shown in FIG. 19) having multiple cubby-holes 768 can be provided. Each cubby hole 768 has a separate light 770 associated with that cubby hole 768. When the first sub-batch of the sub-order is printed on one of the print lines 612 and the sub-batch bar code printed on its destination identifier print is read by the bar code reader 758, instead of lighting a light 760 over one of the packaging material bins 762 and one of the shipping bins 764, a light 770 corresponding to one of the cubby holes 768 is illuminated, which indicates that the operator should place the image prints for that sub-batch in the cubby-hole 768 associated with the illuminated light 770 in order to wait for the other sub-batch to be printed on the other print line 612. When the other sub-batch is printed and its sub-batch bar code number is read by that print line's bar code reader 758, the light 770 associated with that cubby hole 768 is again illuminated. The operator would see that the indicated cubby-hole 768 already has image prints in it, which indicates that the operator should combine the two sub-batches. Also, a light 760 over one of the packaging material bins 762 and one of the shipping bins 764 could be illuminated in combination with light 770 in order to indicate what type of packaging material and shipping method should be used to package and ship the combined sub-batches. It is to be understood, however, that other storage and/or consolidation devices can be used (e.g., a storage rack can include, instead of lights 770, a display monitor for displaying a cubby-hole number corresponding to a cubby hole in which a particular sub-batch is to be placed).

Referring again to FIG. 10, the line equipment 618 also includes photo-sensors along the print line 612 that sense when the image prints pass by each of the sensors. Photo-sensors 644, 646, 648, 650, and 652, respectively, are located in between the printer 622 and the verification and quality check equipment 624, in between the verification and quality check equipment 624 and the inverter 630, in between the inverter 630 and the alignment equipment 632, in between the curl reduction equipment 635 and the back-printer 634, and in between the bar code reader 636 and the binning equipment 638. Each of the photo-sensors 644, 646, 648, 650, and 652 (and the other sensors including the bar code readers 626, 636, and 758 and alignment sensor 718) is attached to the line controller 614 via a separate interface card (not shown). Each interface card includes a micro-controller that is programmed to respond to an interrupt that is generated each time there is a level change in the signal generated by that interface card's photo-sensor (or each time a bar code is read in the case of the interface cards connected to the bar code readers 626, 636, and 758). The micro-controller is programmed to capture various data associated with each level change and transmit a packet containing the data to the line controller 614. For example, the micro-controller is programmed to capture the time at which the level change occurred, the state of the sensor after the level change (or the bar code that was read), an identification number associated with that sensor, a sequence number that is used by the line controller 614 to determine if it has missed any packets from that sensor, and a checksum.

Also, the micro-controller can be programmed to periodically send out a "ping" packet if no level-changes have occurred within a predetermined time period in order to let the line controller 614 know that the sensor and the interface card are operational. Sending the ping packets shortens the time required to detect failures in the sensors because the line controller knows that a properly functioning sensor sends out a ping packet at least once during every predetermined time period. So if no packet has been received from a given sensor for a period of time greater than the predetermined time period, the line controller 614 concludes that there may be a problem with that photo-sensor. Also, using ping packets allows a one-way communication path (from the sensor to the line controller 614) since the line controller 614 does not need to be able to send messages to the sensors in order to determine if the sensors are operational.

The line controller 614 and/or the interface cards can be configured to detect error conditions based on the information contained in the level-change packets. For example, the photo-sensors 644, 646, 648, 650, and 652 can be used to establish a timing profile for the print line 612. When the print line 612 is powered on, the image processor 620 generates a series of test destination identifier images that are printed by the line equipment 618. How long it takes each of the test destination identifier prints to pass each of the photo-sensors 644, 646, 648, 650, and 652 is determined by the line controller 614 using the message packets received from the photo-sensors 644, 646, 648, 650, and 652 as the destination identifier prints make their way down the line equipment 618. The line controller 614 calculates the average time it took each destination identifier print to make to each of the photo-sensors 644, 646, 648, 650, and 652. Based on this timing data, a timing profile for that print line 612 (referred to as the "line profile") is created that sets forth how long it should take a print printed on the print line 612 to pass the various photo-sensors 644, 646, 648, 650, and 652. The line profile data for each of the photo-sensors 644, 646, 648, 650, and 652 (i.e., how long it should take a given image print to get to a given photo-sensor) can be sent to the respective interface cards for the photo-sensors 644, 646, 648, 650, and 652. Then, when an image is sent to the printer 620, the time that the image was sent to the printer is sent to interface cards associated with each of the photo-sensors 644, 646, 648, 650, and 652 so that the interface cards can determine if a given print is taking too long to reach that photo-sensor, which may indicate that there is jam or other fault condition requiring attention. Also, line profile data can be used to detect and compensate for any drift (or other types of variation in processing parameters) that may be introduced into the print line 612 over time (e.g., due to equipment wear or variations in temperature).

In addition to, or instead of, using the photo-sensors 644, 646, 648, 650, and 652 to generate a line profile, the photo-sensors 644, 646, 648, 650, and 652 can be used to generate a "batch" profile indicative of the timing between successive image prints in a batch. In other words, the batch profile would indicate how long it should take after a given photo-sensor senses a first image print for that photo-sensor to sense the next image print in the batch. This batch profile can be created, for example, by measuring, at each of the photo-sensors 644, 646, 648, 650, and 652, the time between first sensing the destination identifier print and first sensing the first image print in the batch. The batch profile would then be the average of the measured time differences measured by each of the photo-sensors 644, 646, 648, 650, and 652. This batch profile could then be used for detecting detect error conditions in the print line 612 and/or for process control and optimization.

The last photo-sensor 652 in the print line 612 also can be used to determine when to index the bin conveyor 750. The control data for the sub-batch that is currently being printed can be sent to the interface card associated with the last photo-sensor 652; the control data is used by the interface card to determine when the last image in that sub-batch has been sensed by the last photo-sensor 652. For example, the interface card can count the number image prints that have been sensed by the last photo-sensor 652 in order to determine when the last image print for that sub-batch has been sensed. When the last image print has been sensed, the interface card can index the bin conveyor 750 after a suitable delay that allows the last image printed to be binned. Also, the network interface card associated with the last photo-sensor 652 (or other device that controls the indexing of the bin conveyor 750) can be programmed to index the bin conveyor 750 in a way that collects improperly printed image prints in a single bin for discarding by the operator when an error condition is detected. For example, the improperly printed image prints can be collected in the bin for the current sub-batch, in which case the entire sub-batch would be discarded, or the bin conveyor 750 can be indexed so that the improperly printed image prints are collected in a separate bin so that only the improperly printed image prints are discarded. The operator can be instructed to discard the improperly printed image prints in the bin by lighting a light 760 over a discard bin. Then, the improperly-printed images can be reprinted and/or other corrective measures taken such as combining the reprinted image prints with other image prints that were printed before the error occurred.

It is to be understood that FIG. 10 shows but one possible implementation of line equipment and personnel 618 that is suitable for use in the system 600; other implementations can be used. For example, the binning, packaging, consolidation, and shipping equipment 638, 640, 641, and 642 can be modified so that the packaging, consolidation, and shipping functions of the print lab system 600 are automated and do not require an operator to perform these line functions. An automated insertion system 850 that can be used in place of or in addition to the binning, packaging, consolidation, and shipping equipment 638, 640, 641, and 642 is shown in FIG. 20. The automated insertion system 850 includes an insertion feeder 852 (e.g., an insertion feeder of the type commonly employed in automated mail processing systems) for receiving image prints after they have been printed and backprinted. For example, the insertion feeder 852 can be positioned at the end of the belt conveyor 732 shown in FIG. 16 so as to receive the image prints as they come off of the belt conveyor 732. The insertion feeder 852 can include a chute or slide on which the image prints slide from the belt conveyor 732 to an automatic inserter 854.

Automatic inserter 854 automatically inserts the one or more image prints from a given sub-batch into the packaging material for that sub-batch. After insertion, an automated sealer 856 automatically seals the packaging material. After the image prints have been inserted into the packaging material and the packaging material has been sealed, the package of image prints can be sorted (e.g., by weight and/or ZIP code) into the proper shipping bin using a sorting chute 858. One end of the sorting chute 858 receives the packaged sub-batch from the automated sealer 856, while the other end of the sorting chute 858 is moved (e.g., by a conventional servo-motor apparatus) over the proper shipping bin for that packaged sub-batch; as a result, when the packaged sub-batch exits the sorting chute 858, the packaged sub-batch falls into the proper shipping bin. Automated insertion and sealing equipment that is conventionally used in automated mail processing applications can be modified for use in the print line 612. Although the components of the automated insertion system 850 are shown as separate components, it is to be understood that one or more of the components of the automated insertion system 850 can be combined. Moreover, it is to be understood that other automated insertion, sealing, and/or sorting techniques and/or equipment may be used in a print line 612. By using the automated insertion system 850, a print line can be provided that is fully automated (i.e., does not require an operator to perform any of the line processing functions) from the point the images are uploaded by a user until the packaged image prints are placed in a shipping bin for shipping to the specified recipients.

FIG. 21 is a state diagram showing states that are maintained by the orders database 602 to track the processing of each image print that is to be generated from an order. After an order is received from a user 2001, all the image prints to be generated from the order enter an "Entered" state 2002 indicating that the images from which the image prints are to be generated are part of an order but have not yet been sent to a print lab for printing. Once the order has been sent to a print lab for printing, the image prints enter a "Processing" state 2004 indicating that the images from which the image prints are to be generated have been sent to a print lab for printing. After an image print has been printed and binned, the image print enters a "Binned" state 2006 indicating that the image print has been printed and binned. After each image print has been shipped, the image print enters a "Shipped" state 2008 indicating that the image print has been shipped. Also, if the image print is stored (e.g., in the storage rack 767) so that the image print can be combined for shipping with other image prints from the same sub-order, the image print enters a "Stored" state 2010 indicating that the image print has been stored. It is to be understood, however, that not all image prints will enter the Stored state 2010.

The same states 2002–2010 also are maintained by the scheduler 608 for the image prints after the images from which the image prints are to be generated have been received by the scheduler 608; however, the image prints enter the Entered 2002 state after the images from which the image prints are to be generated have been received by the scheduler 608 (shown in parenthesis in FIG. 21). Also, the Processing state 2004 is entered by image print when that image from which that image print is to be generated has been sent to a print line 612 for printing. Each image print in an order enters the Binned, Shipped, and Stored states 2006, 2008, and 2010 when the image print has been binned, shipped, and stored, respectively.

The states 2002–2010 shown in FIG. 21 can be used to track the image prints as they are being printed and to recover from errors in the printing process. For example, if an error occurs during the processing of a given batch, all image prints for the print line 612 having the error that are in the Processing state 2004 when the error occurs still need to be printed after the error has been removed from the print line 612; however, any image prints for that batch that are in the Binned state 2006, Shipped state 2008, and Stored state 2010 when the error occurs need not be printed again once the error is removed from the print line.

The techniques, methods, and systems described here may find applicability in any computing or processing environment in which users desire to order physical manifestations (e.g., prints) of digital content and have them distributed to one or more intended recipients. For example, these techniques could be applied to allow users to choose or develop a holiday (e.g., Christmas) card design online (including images and other graphics, personalized text, personalized signatures, and/or any type of computer-generated content) and then have physical copies of that design produced (e.g., actual paper-and-ink Christmas cards) and distributed automatically to everyone on the user's Christmas card list. This same concept could be applied to enable users to design physical post cards, wedding or party invitations, thank you cards, and the like and to have them produced and distributed. In the same vein, businesses could use these techniques to design targeted mailings (sets of targeted coupons, an advertisement made up of selected text and graphic components, etc.) and have them produced and distributed to specified recipients.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices. Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage deices suitable for tangibly embodying computer instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

These elements also can be found in a conventional desktop or workstation computer as well as other computers suitable for executing computer programs implementing the methods described here, which can be used in conjunction with any content viewing or manipulation software, or any other software capable of displaying portions of a larger body of content. Any of the foregoing may be supplemented by, or implemented in, specially designed ASICs (application specific integrated circuits).

A number of embodiments have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components. Accordingly, other embodiments are within the scope of the following claims.

What is claimed is:

1. A method of backprinting image prints comprising:
   receiving an order specifying a plurality of recipients and, for each specified recipient, a set of one or more images associated with that recipient;
   for each recipient specified by the order, separating the images associated with the recipient into at least one printable unit of images;
   for each printable unit, printing each image in the printable unit on a first side of an image print; and
   backprinting non-image information on the other side of one or more of the image prints, wherein the non-image information includes a message and wherein backprinting comprises backprinting a first message on the other side of one or more image prints associated with a first recipient and backprinting another message, different from the first message, on the other side of one or more image prints associated with another recipient.

2. The method of claim 1 wherein the non-image information includes an image number associated with the image.

3. The method of claim 1 wherein the non-image information includes a printable unit number associated with the printable unit from which the image print was printed.

4. The method of claim 1 wherein the non-image information includes an order number associated with the order from which the image print was printed.

5. The method of claim 1 wherein the non-image information includes reorder information.

6. The method of claim 5 wherein the reorder information includes one or more of the following: a telephone number and/or a universal resource locator for a website from which prints can be reordered.

7. The method of claim 1 wherein the non-image information includes a bar code.

8. The method of claim 7 wherein the bar code encodes one or more of the following: an audio message, an image number associated with the image, and a printable unit number associated with the printable unit from which the image print was printed.

9. The method of claim 1 further comprising receiving the message to be backprinted from a user.

10. The method of claim 1 further comprising receiving the first message and the other message from a user.

11. The method of claim 1 further comprising, for each recipient, separating the images associated with the recipient into one or more sub-orders.

12. The method of claim 1 wherein separating the images associated with the recipient into at least one printable unit of images includes, for each sub-order, separating the images associated with the sub-order into one or more sub-batches, each sub-batch representing a printable unit.

13. A method of backprinting image prints comprising:
    receiving an order specifying a plurality of recipients and, for each specified recipient, a set of one or more images associated with that recipient;
    for each recipient specified by the order, separating the images associated with the recipient into at least one printable unit of images;
    for each printable unit, printing each image in the printable unit on a first side of an image print; and
    backprinting non-image information on the other side of one or more of the image prints, wherein the non-image information includes a message and wherein the message includes one or more of the following: name of a photographer who took the image, date the image was taken, date the image was printed, a copyright notice, language describing any legal restrictions on using the image, and an advertisement.

14. The method of claim 13 further comprising inverting the image print prior to backprinting.

15. The method of claim 13 further comprising aligning the inverted image print prior to backprinting.

16. A method of backprinting image prints comprising;
    receiving an order specifying a plurality of recipients and, for each specified recipient, a set of one or more images associated with that recipient;
    for each recipient specified by the order, separating the images associated with the recipient into at least one printable unit of images;
    for each printable unit, printing each image in the printable unit on a first side of an image print;
    backprinting on the other side of one or more of the image prints; and
    reducing curling of the image print prior to backprinting.

17. The method of claim 16 wherein curling of the image print is reduced using suction.

18. A backprinting system comprising:
    a front-end computer sub-system for receiving an order specifying a plurality of recipients and, for each specified recipient, a set of one or more images associated with that recipient;
    a scheduler, in communication with the front-end computer sub-system and a plurality of printers, that, for each recipient specified by one of the orders, separates the images associated with the recipient into at least one printable unit of images;
    one or more printers, in communication with the scheduler, for printing each image in a printable unit on a first side of an image print; and
    one or more backprinters, each backprinter receiving one or more image prints from at least one of the one or more printers and backprinting non-image information on the other side of the one or more image prints, wherein the non-image information includes a message and wherein each backprinter backprints a first message on the other side of one or more image prints associated with a first recipient and backprints another message, different from the first message, on the other side of one or more image prints associated with a second recipient.

19. The system of claim 18 wherein the non-image information includes an image number associated with the image.

20. The system of claim 18 wherein the non-image information includes a printable unit number associated with the printable unit from which the image print was printed.

21. The system of claim 18 wherein the non-image information includes an order number associated with the order from which the image print was printed.

22. The system of claim 18 wherein the non-image information includes reorder information.

23. The system of claim 22 wherein the reorder information includes one or more of the following: a telephone number and/or a universal resource locator for a website from which prints can be reordered.

24. The system of claim 18 wherein the non-image information includes a bar code.

25. The system of claim 24 wherein the bar code encodes one or more of the following: an audio message, the image number associated with the image, and the printable unit number associated with the printable unit from which the image print was printed.

26. The system of claim 18 wherein the front-end computer sub-system receives the message from a user.

27. The system of claim 18 wherein the front-end computer sub-system receives the first message and the other message from a user.

28. A backprinting system comprising:
   a front-end computer sub-system for receiving an order specifying a plurality of recipients and, for each specified recipient, a set of one or more images associated with that recipient;
   a scheduler, in communication with the front-end computer sub-system and the plurality of printers, that, for each recipient specified by the order, separates the images associated with the recipient into at least one printable unit of images;
   one or more printers, in communication with the scheduler, for printing each image in a printable unit on a first side of an image print; and
   one or more backprinters, each backprinter receiving one or more image prints from at least one of the one or more printers and backprinting non-image information on the other side of the one or more image prints, wherein the non-image information includes a message and wherein the message includes one or more of the following: name of a photographer who took the image, date the image was taken, date the image was printed, a copyright notice, language describing any legal restrictions on using the image, and an advertisement.

29. The system of claim 28 further comprising an inverter that inverts the image print prior to backprinting.

30. The system of claim 28 further comprising an alignment device that aligns the inverted image print prior to backprinting.

31. A backprinting system comprising:
   a front-end computer sub-system for receiving an order specifying a plurality of recipients and, for each specified recipient, a set of one or more images associated with that recipient;
   a scheduler, in communication with the front-end computer sub-system and a plurality of printers, that, for each recipient specified by the order, separates the images associated with the recipient into at least one printable unit of images;
   one or more printers, in communication with the scheduler, for printing each image in a printable unit on a first side of an image print; and one or more backprinters, each backprinter receiving one or more image prints from at least one of the one or more printers and backprinting on the other side of the one or more image prints and curl reduction equipment that reduces curling of the image print prior to backprinting.

32. The system of claim 31 wherein the curl reduction equipment includes a vacuum table that uses suction to reduce curling of the image print.

33. The system of claim 31 wherein the scheduler further comprises scheduler software embodied in a computer-readable medium comprising instruction for causing the scheduler to separate the images associated with the recipient into one or more sub-orders.

34. The system of claim 33 wherein the scheduler software further comprises instructions for causing the scheduler, for each sub-order, to separate the images associated with the sub-order into one or more sub-batches, each sub-batch representing a printable unit.

35. A method of backprinting an image, the method comprising:
   receiving backprinting information in an order specifying a plurality of recipients from a user;
   printing an image on a first side of an image print;
   backprinting the backprinting information on the other side of one or more of the image prints; and
   receiving an image from a user, wherein the user from which the backprinting information was received is different from the user from which the image was received.

36. The method of claim 35 wherein the backprinting information includes non-image information.

37. The method of claim 36 wherein the non-image information includes an image number associated with the image.

38. The method of claim 36 wherein the non-image information includes a printable unit number associated with the printable unit from which the image print was printed.

39. The method of claim 36 wherein the non-image information includes an order number associated with the order from which the image print was printed.

40. The method of claim 36 wherein the non-image information includes reorder information.

41. The method of claim 36 wherein the reorder information includes one or more of the following: a telephone number and/or a universal resource locator for a website from which prints can be reordered.

42. The method of claim 36 wherein the non-image information includes a bar code.

43. The method of claim 42 wherein the bar code encodes one or more of the following: an audio message, the image number associated with the image, and the printable unit number associated with the printable unit from which the image print was printed.

44. The method of claim 36 wherein the non-image information includes a message.

45. A method of backprinting an image, the method comprising:
   receiving an order specifying a plurality of recipients and backprinting information from a user;
   printing an image on a first side of an image print; and
   backprinting the backprinting information on the other side of one or more of the image prints, wherein the backprinting information includes non-image information that includes a message including one or more of the following: name of a photographer who took the image, date the image was taken, date the image was printed, a copyright notice, language describing any legal restrictions on using the image, and an advertisement.

46. The method of claim 45 further comprising receiving an image from a user.

47. The method of claim 45 further comprising inverting the image print prior to backprinting.

48. The method of claim 45 further comprising aligning the inverted image print prior to backprinting.

49. A method of backprinting an image, the method comprising:

receiving backprinting information in an order specifying a plurality of recipients from a user;

printing an image on a first side of an image print; and backprinting the backprinting information on the other side of one or more of the image prints; and reducing curling of the image print prior to backprinting.

50. The method of claim 49 wherein curling of the image print is reduced using suction.

51. A backprinting system comprising:

a front-end computer sub-system for receiving an image and backprinting information in an order specifying a plurality of recipients from a user;

a printer, in communication with the front-end computer sub-system, for printing the image on a first side of an image print; and a backprinter that receives one or more image prints from the printer and backprints the backprinting information on the other side of the one or more image prints, wherein the backprinting information includes information generated by the backprinting system, the backprinting information includes non-image information; and the non-image information includes one or more of the following: an image number associated with the image, a printable unit number associated with the printable unit from which the image print was printed, an order number associated with the order from which the image print was printed, reorder information, a bar code, and a message wherein the message includes one or more of the following: name of a photographer who took the image, date the image was taken, date the image was printed, a copyright notice, language describing any legal restrictions on using the image, and an advertisement.

52. The system of claim 51 wherein the reorder information includes one or more of the following: a telephone number and/or a universal resource locator for a website from which prints can be recorded.

53. The system of claim 51 wherein the non-image information includes a bar code that encodes one or more of the following: an audio message, the image number associated with the image, and the printable unit number associated with the printable unit from which the image print was printed.

54. The system of claim 51 further comprising an inverter that inverts the image print prior to backprinting.

55. The system of claim 51 further comprising an alignment device that aligns the inverted image print prior to backprinting.

56. A backprinting system comprising:

a front-end computer sub-system for receiving an image and backprinting information in an order specifying a plurality of recipients from a user;

a printer, in communication with the front-end computer sub-system, for printing the image on a first side of an image print;

a backprinter that receives one or more image prints from the printer and backprints the backprinting information on the other side of the one or more image prints; and curl reduction equipment that reduces curling of the image print prior to backprinting.

57. The system of claim 56 wherein the curl reduction equipment includes a vacuum table that uses suction to reduce curling of the image print.

58. An article of manufacture made in response to an order specifying a plurality of recipients, the article comprising:

an image print medium having a scanable symbol embodied on the back of the image print, wherein the scanable symbol causes a scanner to decode information encoded in the scanable symbol when the scanable symbol is scanned by the scanner, wherein the scanable symbol is a bar code that causes a bar code reader to decode information encoded in the bar code and wherein the bar code encodes a number associated with the article of manufacture, the bar code causing the scanner to identify the article of manufacturer by decoding the number.

59. The article of manufacture of claim 58 wherein the scanable symbol encodes user-input information.

60. The article of manufacture of claim 59 wherein the scanner decodes the user-input information.

61. The article of manufacture of claim 58 wherein the bar code encodes an audio message that causes the bar code reader to play the audio message when the bar code reader scans the bar code.

62. The article of manufacture of claim 61 wherein the audio message is input by a user.

* * * * *

UNITED STATES PATENT AND TRADEMARK OFFICE
CERTIFICATE OF CORRECTION

| | | |
|---|---|---|
| PATENT NO. | : 6,646,754 B1 | Page 1 of 1 |
| APPLICATION NO. | : 09/450899 | |
| DATED | : November 11, 2003 | |
| INVENTOR(S) | : Redd et al. | |

It is certified that error appears in the above-identified patent and that said Letters Patent is hereby corrected as shown below:

On Title Page Item (75)

In the issued patent, the middle name "Jarrett" was misspelled as "Jarret". The correct full names of the first inventor should read --Redd; Jarrett L.--.

Signed and Sealed this

Twenty-seventh Day of March, 2007

JON W. DUDAS
*Director of the United States Patent and Trademark Office*